United States Patent [19]
Sekozawa et al.

[11] Patent Number: 5,097,809
[45] Date of Patent: Mar. 24, 1992

[54] ENGINE CONTROL SYSTEM AND METHOD FOR CHANGING ACCELERATION RESPONSE CHARACTERISTIC

[75] Inventors: Teruji Sekozawa, Kawasaki; Takanobu Ichihara, Katsuta; Makoto Shioya, Tokyo; Motohisa Funabashi, Sagamihara; Kazuya Kawano, Katsuta, all of Japan

[73] Assignee: Hitachi, Ltd., Tokyo, Japan

[21] Appl. No.: 603,933

[22] Filed: Oct. 26, 1990

[51] Int. Cl.⁵ .................................................. F02P 5/14
[52] U.S. Cl. .................................... 123/422; 123/418; 123/492
[58] Field of Search ............. 123/422, 423, 424, 418, 123/419, 492; 364/431.04, 431.07

[56] References Cited

U.S. PATENT DOCUMENTS

| | | | |
|---|---|---|---|
| 4,547,852 | 10/1985 | Kamifuji et al. | 364/431.04 |
| 4,658,787 | 4/1987 | Takizawa | 123/418 |
| 4,732,125 | 3/1988 | Takizawa | 123/422 |
| 4,803,967 | 2/1989 | Ohkumo | 123/422 |
| 4,844,042 | 7/1989 | Osano | 123/492 |
| 4,887,573 | 12/1989 | Fujiwara et al. | 123/422 |
| 4,949,691 | 8/1990 | Abe et al. | 123/419 |

*Primary Examiner*—Raymond A. Nelli
*Attorney, Agent, or Firm*—Antonelli, Terry, Stout & Kraus

[57] ABSTRACT

The present specification discloses an engine control system for controlling the acceleration response characteristics of a vehicle. The engine control system of the present invention operates generated torque of the engine by at least one of measured parameters including an intake air amount per one rotation of the engine, an intake manifold inner pressure and a throttle opening and adjusts the ignition timing in such a direction that a desired acceleration response characteristics is obtained in accordance with a generated torque value.

23 Claims, 29 Drawing Sheets

FIG. 7B $T = 0.257 \text{(sec)}, \Delta t = 1 \text{(sec)}, R = \ell_1/\ell_2 = 2.36$ $$\zeta = \frac{\ell n R}{\omega n \cdot \Delta t} = 0.035$$

$$\omega n = \sqrt{\left(\frac{2\pi}{T}\right)^2 + \left(\frac{\ell n R}{\Delta t}\right)^2} = 24.4$$

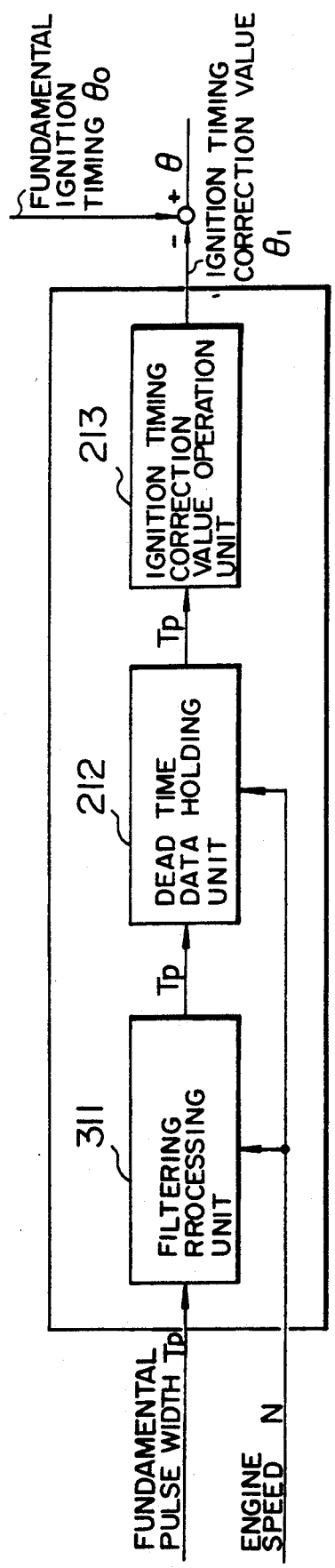
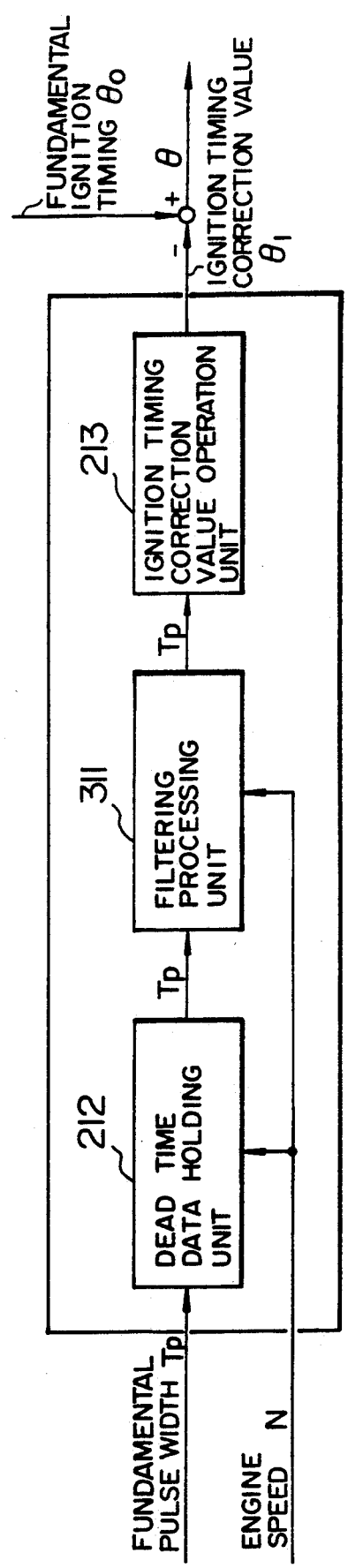

FIG. 26

| RESULT OF INTENTION DETERMINATION | CONTROL PARAMETERS ||||
|---|---|---|---|---|
| | $K_1$ | $K_3$ | $K_2$ | $K_4$ |
| GENTLE | $g_{K_1}$ | $g_{K_3}$ | $g_{K_2}$ | $g_{K_4}$ |
| NORMAL | $n_{K_1}$ | $n_{K_3}$ | $n_{K_2}$ | $n_{K_4}$ |
| SPORTY | $s_{K_1}$ | $s_{K_3}$ | $s_{K_2}$ | $s_{K_4}$ |

FIG. 32
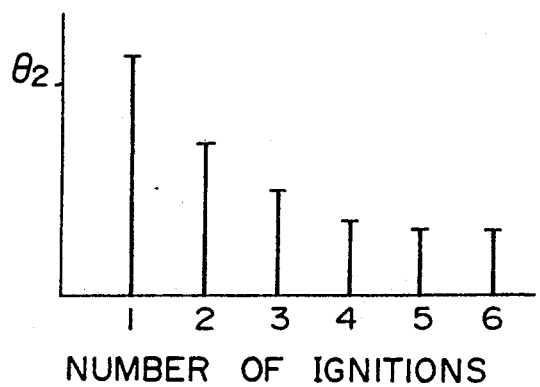
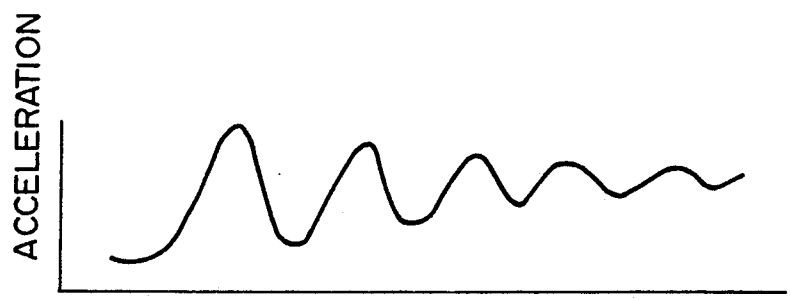
FIG. 33(a)
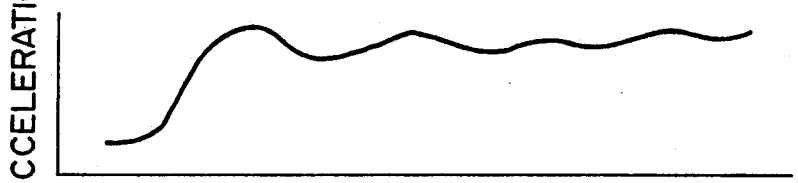
FIG. 33(b)
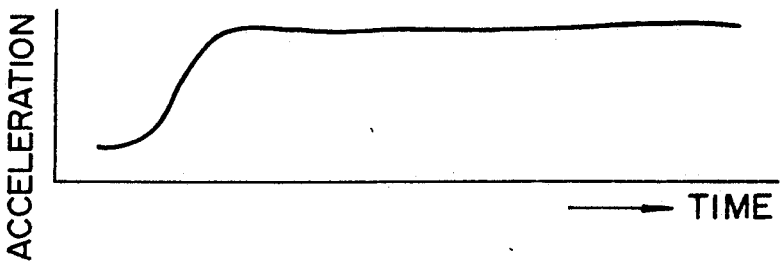
FIG. 33(c)

ENGINE CONTROL SYSTEM AND METHOD FOR CHANGING ACCELERATION RESPONSE CHARACTERISTIC

BACKGROUND OF THE INVENTION

The present invention relates to an engine control system for changing the acceleration response characteristics of a vehicle engine and method for controlling the same.

It is ideal if an automobile can be quickly and smoothly accelerated with increase in the amount of actuation of the accelerator pedal by the operator.

However, the drive-line system between the engine torque output shaft and the tires in an actual automobile is not considered as a complete by rigid body. In other words, the engine output cannot be instantaneously transmitted to the tires without being changed in the course thereof. The drive-line system includes components such as a main drive shaft, an axle shaft, engine mounts and suspensions. These components have elasticity which is a factor of a delay caused in the drive-line system.

Accordingly, even if the engine torque output is increased to effect acceleration of the vehicle, drive-line system first absorbs the output energy the and then it releases most of the absorbed energy to the transmit it to tires after a delay of a given period of time. Simultaneously with this, a part of the released energy is reflected back to the engine. Tires are also elastic bodies, resulting in a delay until the transmitted driving force will become a propelling force relative to the road surface. Therefore, a part of the energy, of the driving force is reflected by the tires and is transmitted back to the engine.

Delay and reflection of the energy transmission in the drive-line system is vibrational. Reflection functions as braking for engine torque output to cause a change in the engine speed. If vibrational braking occurs in the engine and the drive-line system, a surging phenomenon could occur during a period of the acceleration. Since it is deemed that the surging phenomenon mainly depends upon the elasticity of the drive-line system, the surging phenomenon would be vibrational if the period of the vibration is close to a natural period of the vibration of the drive-line system. This will cause unwanted vibration rocking the vehicle mainly in a longitudinal direction, which makes the driver or passengers feel very uncomfortable. This may occasionally cause rolling and/or pitching of the vehicle.

In a vehicle, such a surging phenomenon during acceleration should be prevented from occurring. If such surging during acceleration is prevented from occurring and, simultaneously with this, the acceleration response characteristics of the vehicle can be preset to that which a driver desires, an appropriate driving characteristic can be attained depending upon the road surface and/or traffic conditions.

For example, since normally, there is very little opportunity for rapid acceleration during long distance driving on a less crowded free-way, the acceleration response characteristics represented by a relatively slowly increasing curve would be desired during this type of driving from the view point of comfort and fuel economy. On the other hand, a sharp acceleration characteristic may be necessary on streets in downtown where stop-and-go driving is frequent or on mountain roads. Alternatively, an acceleration characteristic intermediate therebetween may be necessary under other circumstances.

A method of controlling an engine to obtain an acceleration characteristic exactly reflecting a driver's intention is disclosed in Japanese Unexamined Patent Publication No. JP-A-60-175742 filed on Feb. 23, 1984 by Toyota Motor Company Ltd. The invention disclosed in this publication relates to a torque servo control, in which a target torque is calculated by a torque generation function with measured parameters, such as the extent of depression amount of the accelerator pedal and engine speed, so as to control an intake air amount and a fuel injection amount in such a manner that the output torque will become equal to a target torque according to a difference between the output torque actually measured by a torque sensor and the target torque.

Japanese Unexamined Patent Publication No. JP-A-59-113269 filed on Nov. 8, 1983 by Robert Bosh GmbH claiming Convention Priority based on German Patent Application No. P3243235.6 filed on Nov. 23, 1983 discloses a method of controlling vibrations, in which a vibration of an engine is detected and the polarity (positive or negative) of an ignition timing correction value is changed depending upon the vibration direction.

Japanese Unexamined Patent Publication No. JP-A-59-165865 filed on Mar. 9, 1983 by Toyota Motor Company Ltd. discloses a method of suppressing acceleration surging by controlling the ignition timing using a sinusoidal function signal having a frequency equal to a resonance frequency of a drive-line system and having a phase opposite to the phase thereof.

Although a torque servo system requires a torque sensor, it is difficult to realize a practical torque sensor which can perform an accurate torque detection in view of technical difficulty and cost. The torque servo has a long time lag until change in accelerator is converted into change in output torque so that it is difficult to accurately suppress the vibration by a feedback of the measured torque value.

A system for controlling ignition timing in response to detection of vibration of an engine is ineffective for an initial large vibration, since the vibration suppression action can be initiated only after the vibration occurs.

A system for controlling ignition timing using a signal having a frequency equal to and a phase, opposite to a resonance wave of a drive-line system has been proposed to detect an acceleration from a change in intake air amount per one rotation of the engine and to provide an ignition timing signal with a vibration control signal simultaneously with the detection of acceleration. In this case, there is a time lag from an initiation of acceleration action to torque generation via mixture intake, compression and expansion strokes. Accordingly, in this technique, there may occur a timing lag between commencement of longitudinal vibration of the vehicle due to initial torsional vibration and control. Therefore, there is a problem that not only cannot he above mentioned torsional vibration be timely suppressed, but also the vibration may be adversely amplified by a starting timing for correcting the ignition timing in the worst case.

SUMMARY OF THE INVENTION

The present invention was made in view of the above-mentioned circumstances. It is an object of the present invention to provide a response characteristic control system which overcomes the above mentioned problems in prior systems and can suppress vibrations of a vehicle in the longitudinal direction occurring during acceleration or deceleration and can optionally preset a peak value of the acceleration of the vehicle or the acceleration response characteristics thereof. Specifically, it is an object of the present invention to provide a response characteristic changing control, system which makes it possible to control acceleration to provide a driving feeling which drivers or occupants desire by optionally presetting a plurality of different acceleration response characteristics (indicial response) for the same amount of depression (step input) of an accelerator pedal during acceleration.

It is another object of the present invention to provide a method of accurately assuming a period of time (hereinafter referred to as torque generation dead time) taken for a response characteristic changing control system from detection of acceleration to rise-up of torque.

The engine output torque characteristics of an engine are substantially determined by the engine speed, intake air amount per one rotation and air/fuel ratio and the ignition timing. The present invention controls the ignition timing as one of the torque control parameters since the ignition timing is a control parameter applicable to the combustion stroke and is a variable which is, among the other parameters related in time with torque generation. The engine can decrease or increase the engine output torque by retarding or advancing the ignition timing within a range of limits of misfire or knocking while the other parameters are kept constant with respect to a fundamental ignition timing determined by the intake air amount per one rotation of the engine.

It has been emperically found that the control response of a drive-line system which receives an engine output torque and produces acceleration can be expressed by a second-order oscillation system.

In other words, its transfer function is represented as G(s), which is expressed as follows:

$$G(s) = \omega^2{}_n/(s^2 + 2\zeta\omega_n s + \omega^2{}_n)$$

$\omega_n$: natural angular frequency
$\zeta$: damping coefficient
s: Laplace operator Therefore, the response characteristics of the driving power transmission system has a non-vibrational characteristic or a vibrational indicial response characteristic depending on the value of the damping coefficient $\zeta$ for a step input of torque.

The basic principle of the present invention resides in feed forward control in which a compensation control system having a response reference model is coupled in series with this control object for cancelling a pole of a transfer function of a drive-line system to be controlled with a zero of a compensation control system, resulting in a desired transfer function, whereby a desired acceleration response characteristics is obtained by a correction value of the ignition timing operated by the compensation control system.

A control model based on the basic principle of the present invention is shown in block diagram of FIG. 1.

In FIG. 1, a value of a measurement parameter of an engine is detected by a sensor unit 10. A response reference model unit 20 indirectly determines or calculates generated torque by a given operation using measurement parameters. The response reference model unit 20 is designed so that it has a second-order oscillation system simulating a drive-line system receiving a torque at its input and outputting an acceleration force. The unit 20 feeds a differential value of the acceleration outputted from a second-order lag element back to the input to the second-order lag element and outputs a correction value of the ignition timing depending on the acceleration output from the second-order lag element. Furthermore, the ignition timing correction value outputted from the response reference model unit 20 is given to an ignition device 30. An ignition signal is applied to an engine 40 at a time determined by the ignition device 30 for determining the controlled ignition timing. The engine 40 is operated at the controlled ignition timing so that the generated output is transmitted to tires 60 via the drive-line system 50.

Furthermore, the present invention makes it possible to reflect a torque generation lag time between input of the measurement parameters at the response reference model unit 20 and generation of the engine torque on the basis of the values of parameters in calculation of an ignition timing correction value.

BRIEF DESCRIPTION OF THE DRAWINGS

FIGS. 7A and 7B are view for explaining a method of determining parameters in a vehicle response reference model;

FIGS. 13 through 15 are block diagrams showing essential components of a third embodiment of an ignition timing correction device;

FIGS. 25 through 28 are view for explaining a method of presetting control parameters in the embodiment;

FIG. 32 is a graph showing an example of a table bearing correction values; and

FIGS. 33a-33c is a graph for explaining the effects of the embodiment.

DESCRIPTION OF THE PREFERRED EMBODIMENTS

Preferred embodiments of the present invention will now be described in details with reference to drawings.

Figure 1:
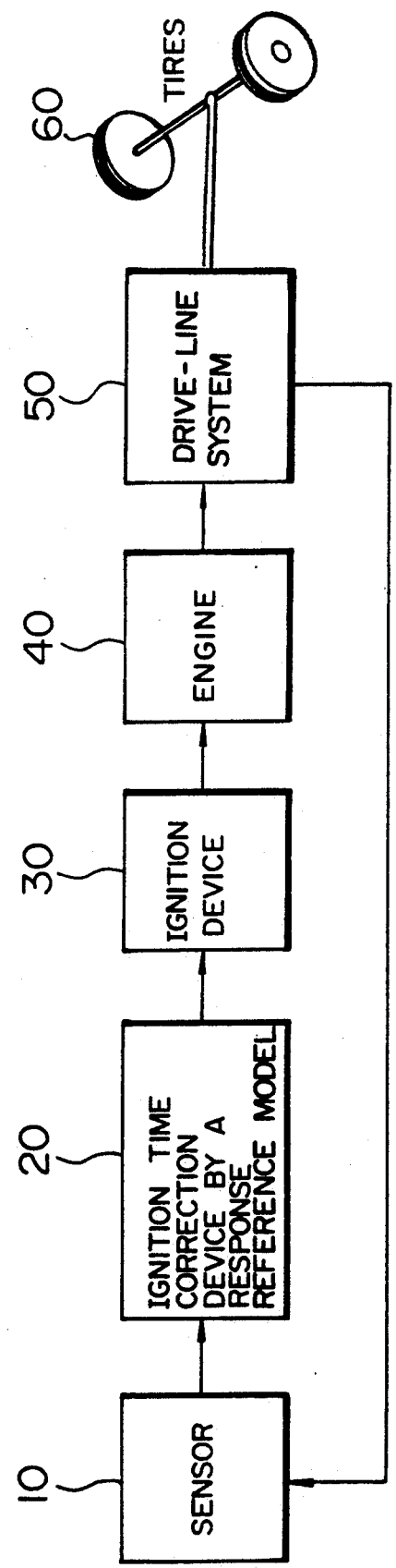
FIG. 1 is a block diagram for explaining the basic principle of the present invention.
Figure 2:
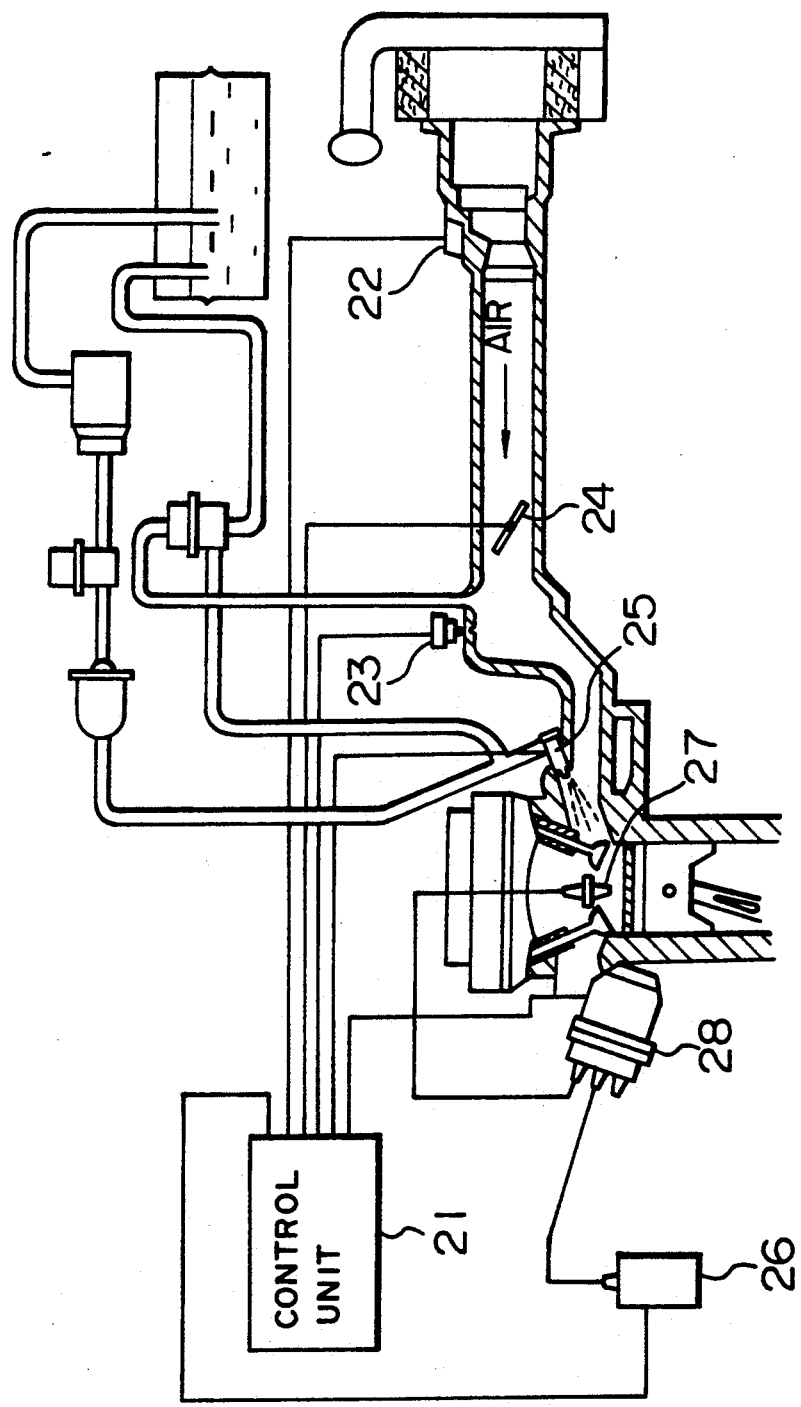
FIG. 2 is a schematic view showing an essential part of an electronic engine control device in which the present invention is applied.

Referring now to FIG. 2, there are shown essential components of an electronic engine control system to which the present invention is applied. In FIG. 2, a control unit 21 including a microcomputer is adapted to receive signals from various sensors and perform various operations for controlling ignition timing and/or fuel injection amount. An air flow sensor 22 measures the air amount flowing into an intake manifold. A pressure sensor measures the pressure in the intake manifold. A throttle sensor 24 detects the throttle opening. Reference numerals 25, 26, 27 and 28 represent a fuel injector, an ignition coil, an ignition plug and a distributor having a crank angle sensor incorporated therein, respectively.

Signals from the above mentioned respective sensors are inputted to the control unit 21 from which the results of predetermined operations are outputted to the fuel injector 25, the ignition coil 26, etc.

Figure 3:
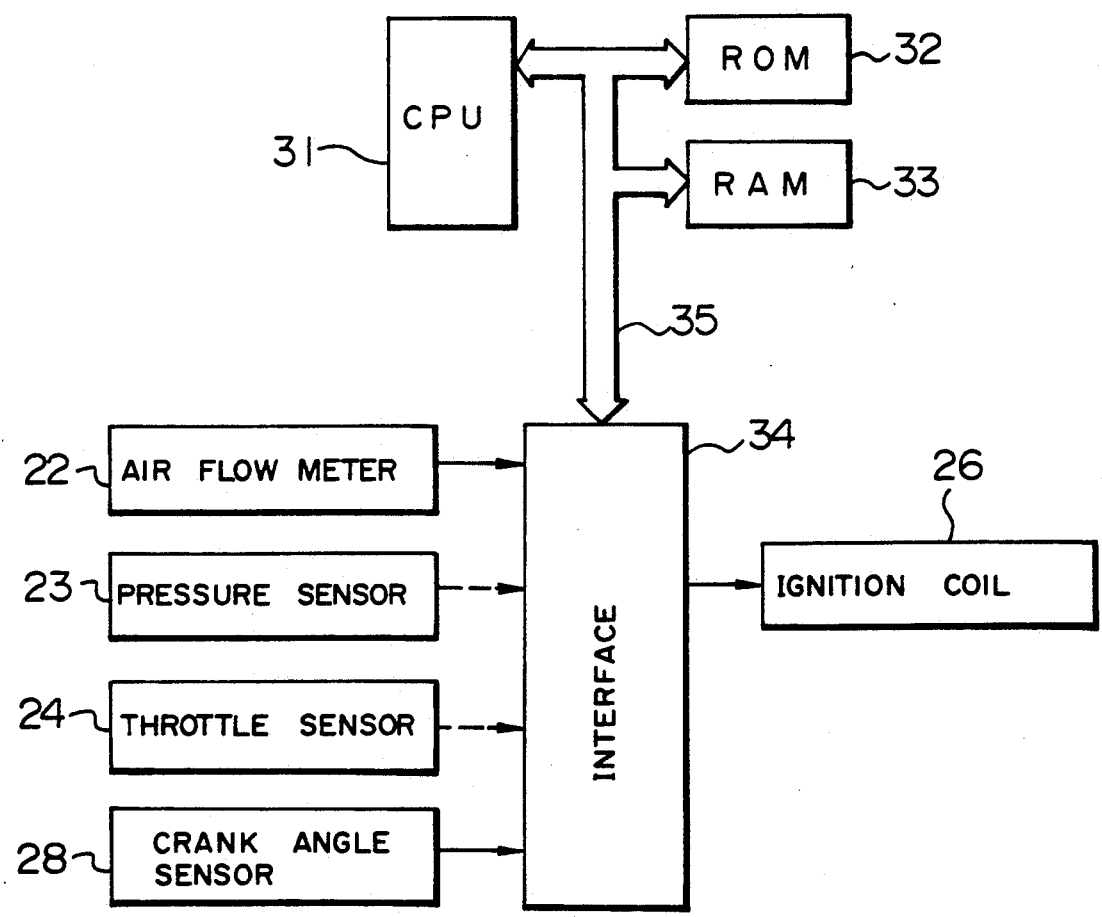
FIG. 3 is a block diagram of a control unit shown in FIG. 2.

FIG. 3 is a block diagram showing the structure of the control unit in FIG. 2. The control unit includes CPU 31, ROM 32, RAM 33, an interface 34 and a bus line 35 for electrically connecting these components with each other. Detection signals are inputted to the CPU 21 via the interface 34 from the air flow sensor 22 or pressure sensor 23 for measuring the intake air amount, and from the throttle sensor 24 and the crank angle sensor 28 for detecting the engine speed.

Figure 4:
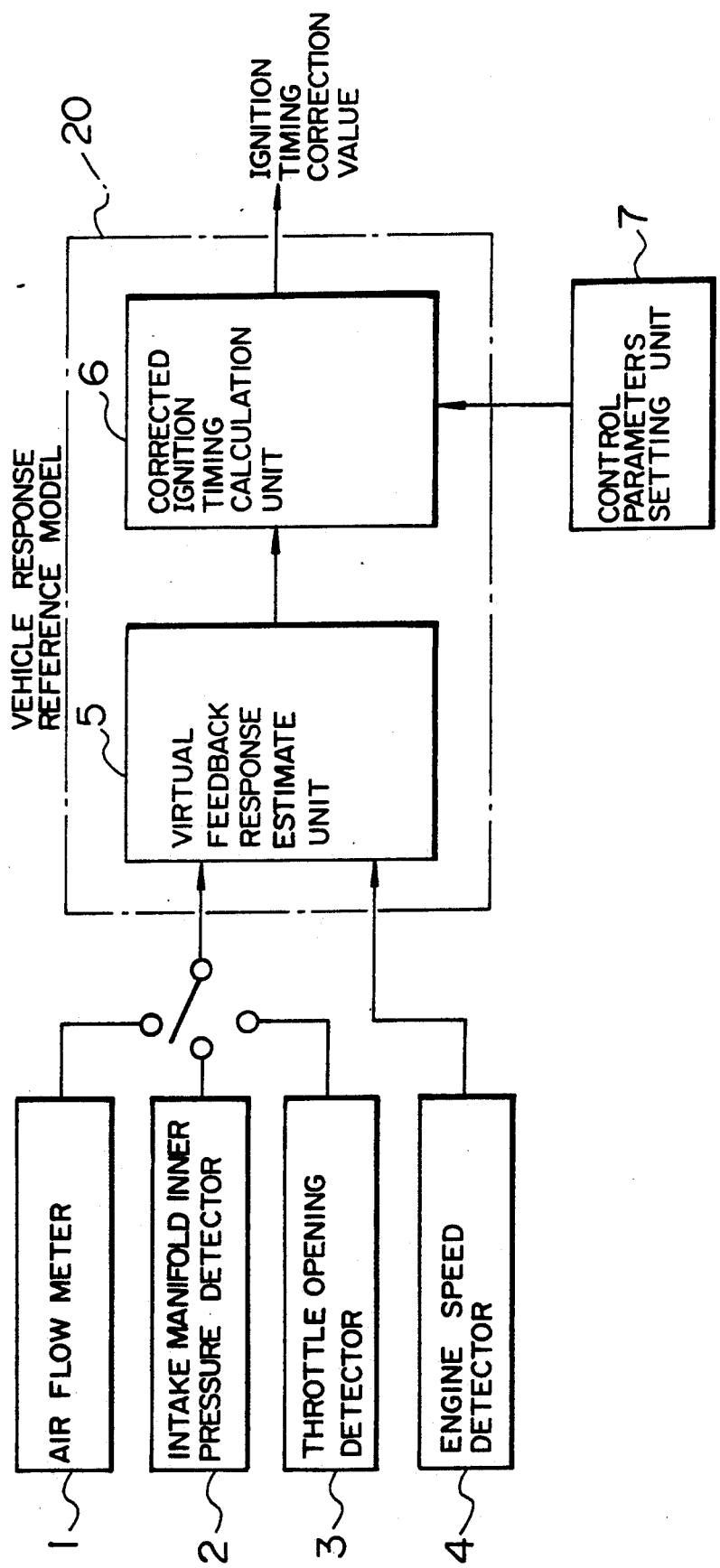
FIG. 4 is a block diagram showing the basic structure of an ignition timing correction device of a response characteristic changing control system of the present invention.

FIG. 4 is a block diagram showing the summary of the first embodiment of the ignition timing correction device of the response characteristic changing control system of the present invention. In FIG. 4, reference numerals 1, 2, 3 and 4 denote an air flow meter, an intake manifold inner pressure detector, a throttle opening detector and an engine speed sensor, respectively. In this control system, a vehicle response reference model 20 is provided which receives at its input the engine speed value detected by the engine speed sensor 4 and any one of the intake air amount detected by the air flow sensor 1, the intake manifold pressure detected by the intake manifold pressure detector 2 and the throttle valve opening detected by the throttle opening detector 3 and outputs a correction value of the ignition timing.

The vehicle response reference model 20 includes a unit 5 for assuming a virtual feedback response, which is a vehicle acceleration obtained if a feedback of the ignition timing is performed based on the acceleration determined by the inputted values from the various detectors, and a unit 6 for correcting the ignition timing based on said virtual feedback response. The ignition timing correction unit 6 assumes an acceleration rate of the vehicle in the longitudinal direction based on the differential value or change in the virtual feedback response output. The vehicle response reference model 20 is associated with a control parameter presetting unit 7 so that a correction pattern of the ignition timing is optionally preset by driver's manipulation of a knob or switch and the like for changing the acceleration response curve to a desired characteristics. The control parameter preset unit 7 may be designed to change the acceleration response curve by changing the correction parameters of the ignition timing based on a signal from a separately provided running load detector (not shown).

In the ignition timing correction device, it is possible to enhance an effect of eliminating the longitudinal vibrations (surging) of the vehicle by adding or subtracting a given value to or from the predetermined ignition timing when the change in the engine speed is larger than a given value.

Figure 5:
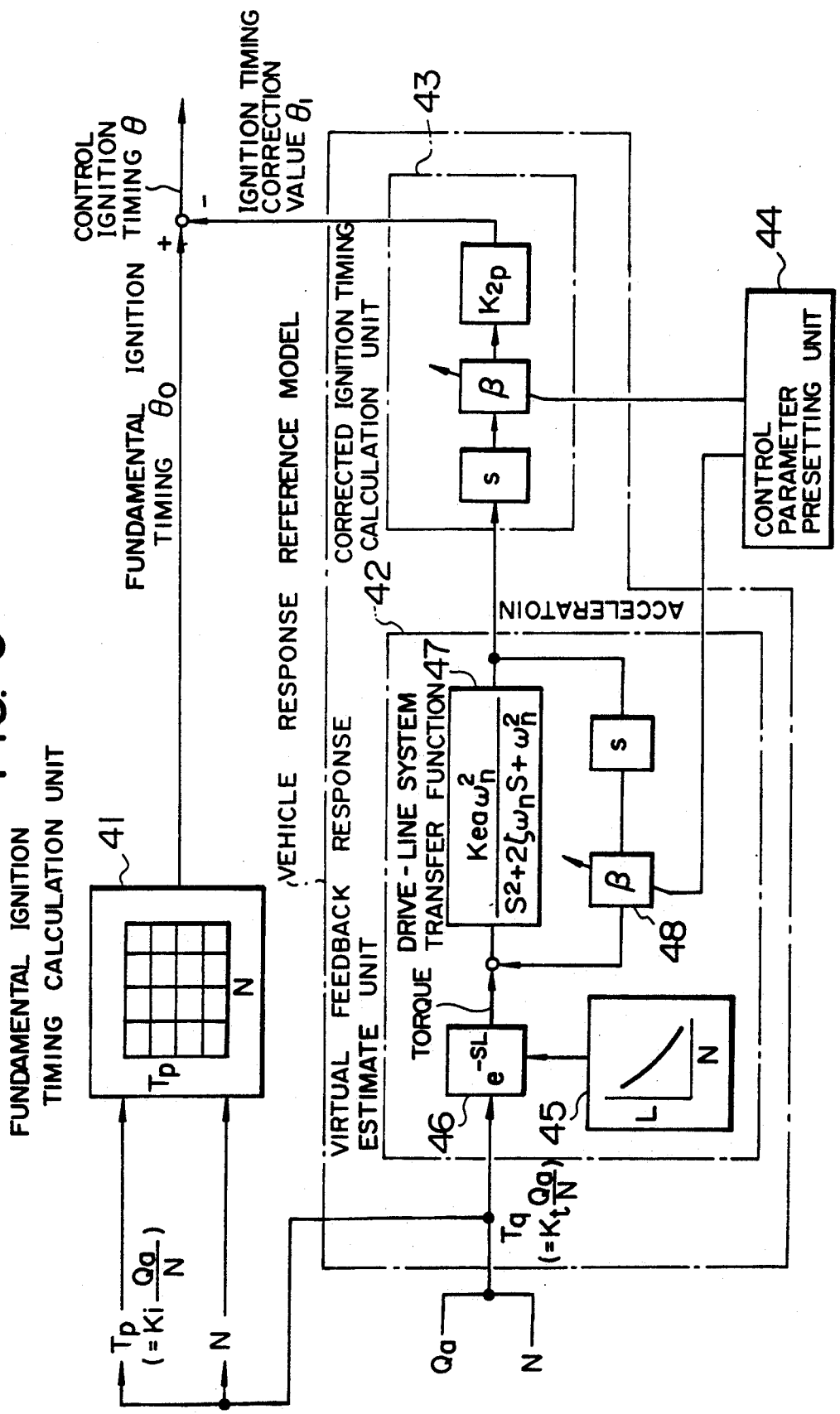
FIG. 5 is a block diagram showing a first embodiment of an ignition timing correction device.
Figure 6:
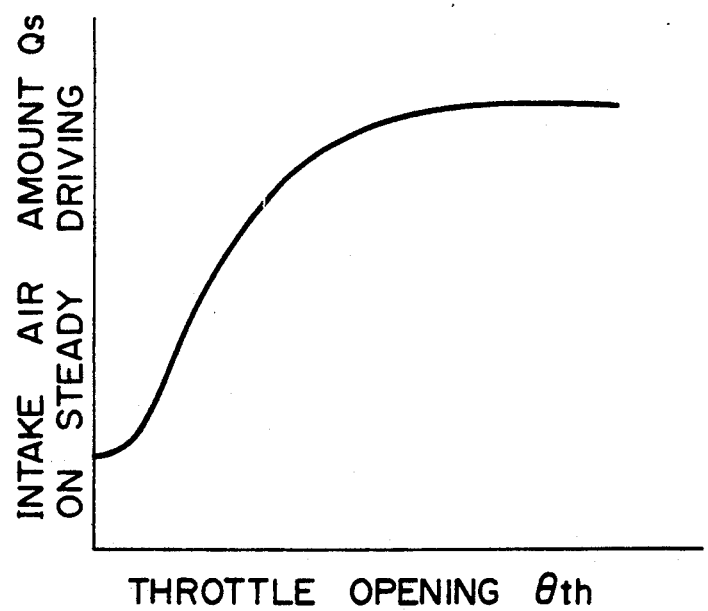
FIG. 6 is a graph showing a specific curve for calculating an intake air amount by using a throttle opening.

FIG. 5 shows detailed structure of the ignition timing correction device. In FIG. 5, reference numerals 41, 42, 43 and 44 denote a fundamental ignition timing calculation unit, a virtual feedback response estimate unit, a corrected ignition timing calculation unit and a control parameter presetting unit, respectively. The reference ignition timing calculation unit 41 calculates a fundamental ignition timing $\theta_O$ from the fuel injection valve opening time $T_p(=K_iQ_a/N$, $K_i$ constant) and the engine speed N with reference to a two-dimensional map 41 showing reference ignition timing.

The virtual feedback response estimate unit 42 receives an intake air amount $Q_a$ detected by the air flow meter 22 (FIG. 2) and an engine speed N and determines $K_tQ_a/N$ by multiplying $Q_a/N$ by a constant $K_t$ to provide an estimated value $T_q=K_tQ_a/N$ of the engine output torque. The intake air amount $Q_a$ can be also approximately calculated from the opening detected by the throttle sensor 24. In this case, the intake air amount $Q_s$ during normal driving corresponding to the detected valve opening $\theta_{th}$ is represented as $Q_a$. The estimated engine torque value $T_q$ may also be calculated from the intake air manifold inner pressure. In this case, the pressure P detected by the pressure sensor 23 is inputted to the model 20 at which the pressure P is multiplied by a constant $K_p$ to provide a torque $T_q=K_pP$.

Figure 7A:
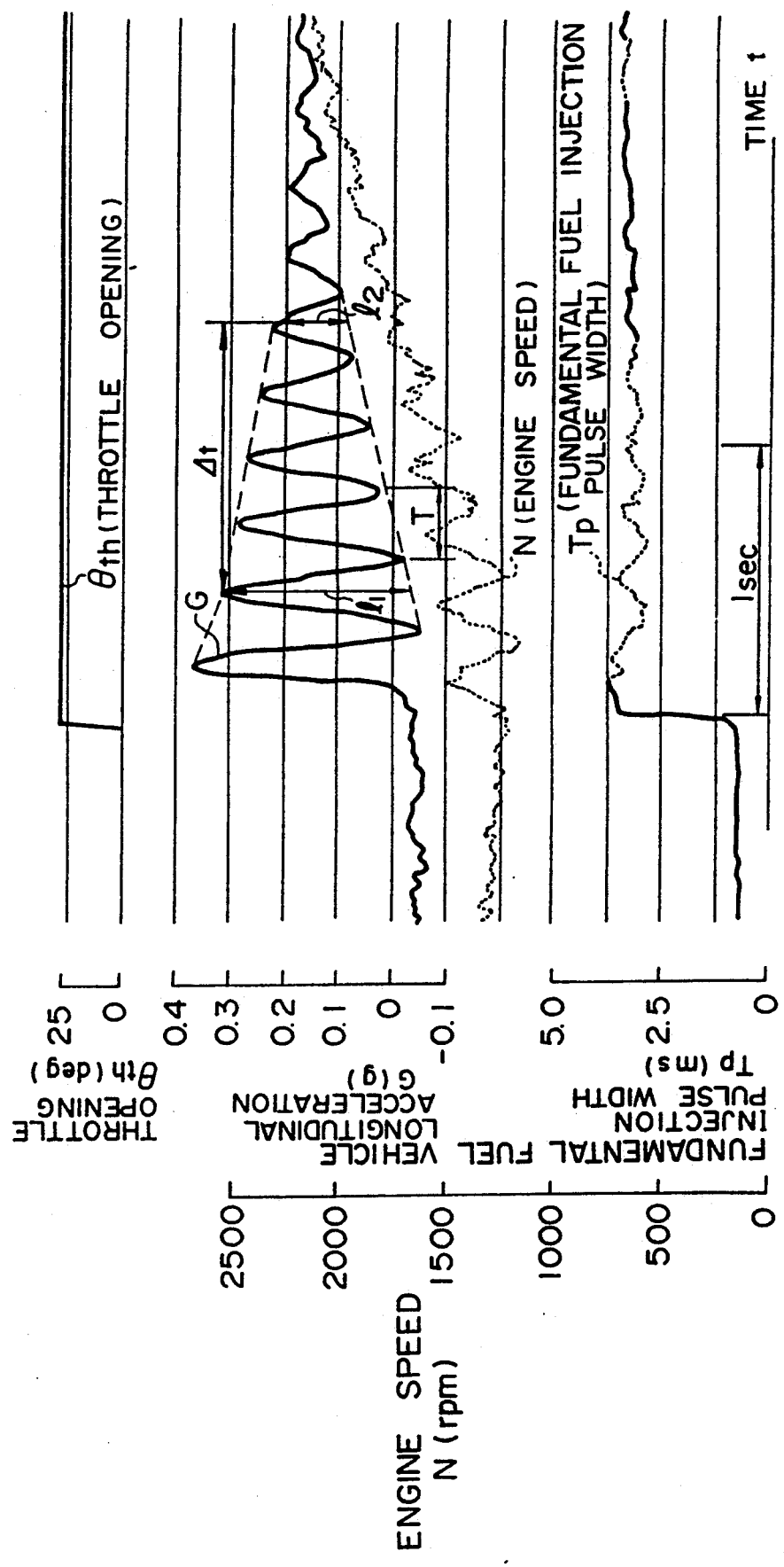

Now returning to FIG. 5, a memory map 45 presets torque generation dead time L which is taken from reception of the above mentioned $Q_a$ and N to actual generation of an engine torque with respect the engine speed N. A reference numeral 46 denotes the dead time L represented by a dead time element $e^{-SL}$ at an s region. A reference numeral 47 denotes a second-order delay transfer function model showing the relation between the engine torque (input) and the vehicle acceleration (output) in the drive-line system 50. The parameters $K_{ea}$, $\zeta$, and $\omega_n$ in the transfer function are preliminarily determined from the period T and amplitudes $l_1$, $l_2$ of the vibration in the acceleration response pattern of an actual vehicle by an experiment as shown in FIG. 7A. In the experiment shown in FIG. 7A, a step input to abruptly open the throttle valve to an opening $\theta_{th}$ from a stop condition of a vehicle on idling (change in throttle opening substantially corresponds to a change in torque) is given to the vehicle. The vehicle acceleration G, the engine speed N, and the transient response of a fundamental fuel injection pulse width $T_p$ at this time are continuously measured. Since the drive-line system which receives torque as an input and provides acceleration force as an output is a second-order delay element as mentioned above, the response characteristic is vibrational in relation to a step input as shown in the drawing. This is perceived as an acceleration surge by the driver. $\zeta$ and $\omega_n$ are determined in advance from the measurements T, $\Delta t$, $l_1/l_2$ shown in FIG. 7B as follows:

$$\zeta = \frac{l_n R}{\omega_n \cdot \Delta t} \quad (1)$$

$$\omega_n = \sqrt{\left(\frac{2\pi}{T}\right)^2 + \left(\frac{l_n R}{\Delta t}\right)^2} \quad (2)$$

wherein R = $l_1/l_2$. A constant $K_{ea}$ is obtained by unit-conversion after conversion of acceleration relative to $T_p$. The vibrational transfer function is added to a differential operation feedback loop having a feedback gain 48. An output in this case provides the above mentioned virtual feedback response. In the corrected ignition timing calculation unit 43, the output (acceleration) of the above mentioned virtual feedback response is differentiated once and is then multiplied by a gain $\beta$ and constant $D_{2p}$ 49 to calculate a correction value $\theta_1$ of the ignition timing. A system including the virtual feedback response estimate unit 42 and the corrected ignition timing calculation unit 43 is the above-mentioned vehicle response reference model, which outputs the correction value of the ignition timing in response to inputs $Q_a$ and N. This vehicle response reference model may be realized by a software program which is executed by the CPU 31 in the control unit 21. Then the corrected ignition timing $\theta_1$ is subtracted from the fundamental ignition timing $\theta_O$ which is an output of the fundamental ignition timing calculation unit to provide a control ignition timing which is fed to an ignition coil 26 of the ignition device 30.

$$\theta = \theta_0 - \theta_1 \quad (3)$$

Figure 8:
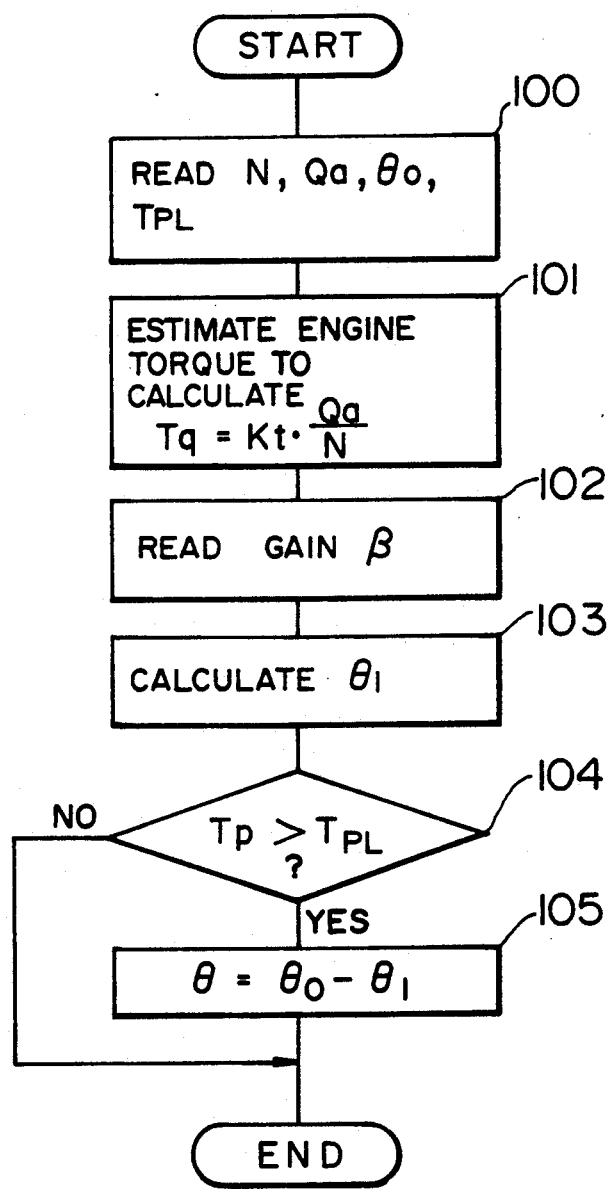
FIG. 8 is a flow chart showing an operation in the embodiment.

Operation of the above-mentioned embodiment will now be described with reference to a flow chart shown in FIG. 8.

At first, the engine speed N, the detected air amount $Q_a$, the fundamental ignition timing $\theta_0$ and the fundamental injection valve opening time $T_{PL}$ having a given level stored in RAM 33 are read (step 100). $K_r \cdot Q_a/N$ relevant to an estimated engine torque $T_q$ is calculated from the read engine speed N and the detected air amount $Q_a$ at step 101. The gain $\beta$ which has been preset in the control parameter presetting unit 44 by a driver is read (step 102). The correction value $\theta_1$ of the ignition timing is calculated in accordance with the vehicle response reference model shown in FIG. 5 (step 103).

A method of calculating a correction value $\theta_1$ of the ignition timing carried out in the ignition timing correction device 20 at step 103 will now be described in more detail.

In the control system of FIG. 5, the vehicle response reference model receiving estimated engine torque $T_q$ as an input and outputting ignition timing correction value $\theta_1$ is represented by a transfer function as follows;

$$\frac{\theta_1}{T_q} = e^{-SL} \cdot \frac{\beta Ks}{s^2 + 2\zeta'\omega_n s + \omega_n^2} \quad (4)$$

wherein,

-continued $$K = K_{ea} K_{2p} \omega_n$$

$$\zeta' = \zeta + \frac{\beta K_{ea} \omega_n^2}{2}$$

Since signals are processed in the form of digital signals in the control unit 21, based on discrete data by sampling, operation formula for calculating the ignition timing correction value $\theta_1$ is expressed as follows:

$$\theta_1(n) = p\theta_1(n-1) - q\theta_1(n-2) + r\{T_p(n-l) - T_p(n-1-l)\}$$

wherein, $$p = \frac{2(1 + \zeta'\omega_n \Delta T)}{1 + 2\zeta'\omega_n \Delta T + \Delta T^2}$$

$$q = \frac{1}{1 + 2\zeta'\omega_n \Delta T + \omega_n^2 \Delta T^2}$$

$$r = \frac{\beta K \Delta T}{1 + 2\zeta'\omega_n \Delta T + \omega_n^2 \Delta T^2}$$

$$l = \left[\frac{L}{\Delta T}\right]$$

([ ] denotes a mark for making a value into an integer)

$\theta_1(n)$P ignition timing correction value calculated this time $\theta_1(n-1)$ ignition timing correction value before one calculation cycle $\theta_1(n-2)$: ignition timing correction value before two calculation cycle before $T_q(n-1)$: estimated engine torque before 1 calculation cycles $T_q(n-1-l)$: estimated engine torque before l+1 calculation cycle T: calculation cycle Then, determination of whether or not the vehicle is in acceleration is carried out at step 104. The determination is carried out by comparing the fuel injection valve opening time $T_p$ with a given fundamental level $T_{PL}$. If it is determined that $T_p$ is larger than $T_{PL}$ so that it is in an acceleration condition, $\theta_0 - \theta_1$ is then determined (step 105) and this value is used as the control ignition timing value $\theta$. In such a manner, ignition timing is not corrected other than during acceleration.

Figure 9:
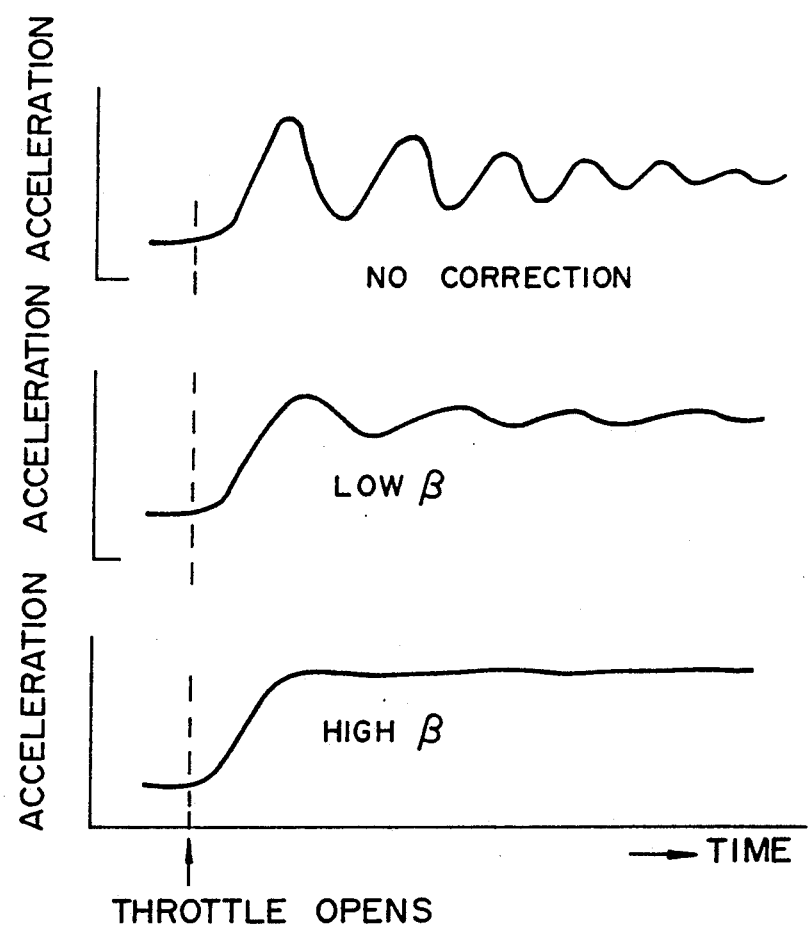
FIGS. 9a–9c is a graph showing effects of the embodiment.

The curve (a) of FIG. 9 shows data of an acceleration experiment when the ignition timing correction is not performed. The curves (b) and (c) of FIG. 9 show data when control is performed to adjust said control parameters to provide low and high gains, respectively.

In case of (a) in FIG. 9, the acceleration will abruptly be increased and thereafter repeats low frequency oscillations. In contrast to this, in case of (b) of FIG. 9 in which control is achieved by the structure shown in FIG. 5, the change in throttle opening is similar to that of (a) in FIG. 9 while the rise-up of the acceleration is moderately slow and the oscillation of the acceleration is reduced. In case of (c) in FIG. 9, the above mentioned feedback gain $\beta$ is higher than that in case (b) of FIG. 9 and the rise-up of the acceleration is slower and the suppression effect of the oscillation of the acceleration is larger. Therefore, the acceleration response curve may be changed by changing the value of the gain 8 by an driver of the vehicle.

Since the correction value $\theta_1$ of the ignition timing is calculated based on the detected air amount $Q_a$, the detected pressure P or the detected valve opening $\theta_{th}$ and the engine rotational number N in accordance with the present embodiment as mentioned above, a response characteristic changing control system which overcomes the problems of response delay of sensors in the feedback system and cost and is capable of realizing acceleration response curves satisfying a driver's intention can be provided.

Now a second embodiment of the ignition timing correction device of the present invention will be described.

Figure 10:
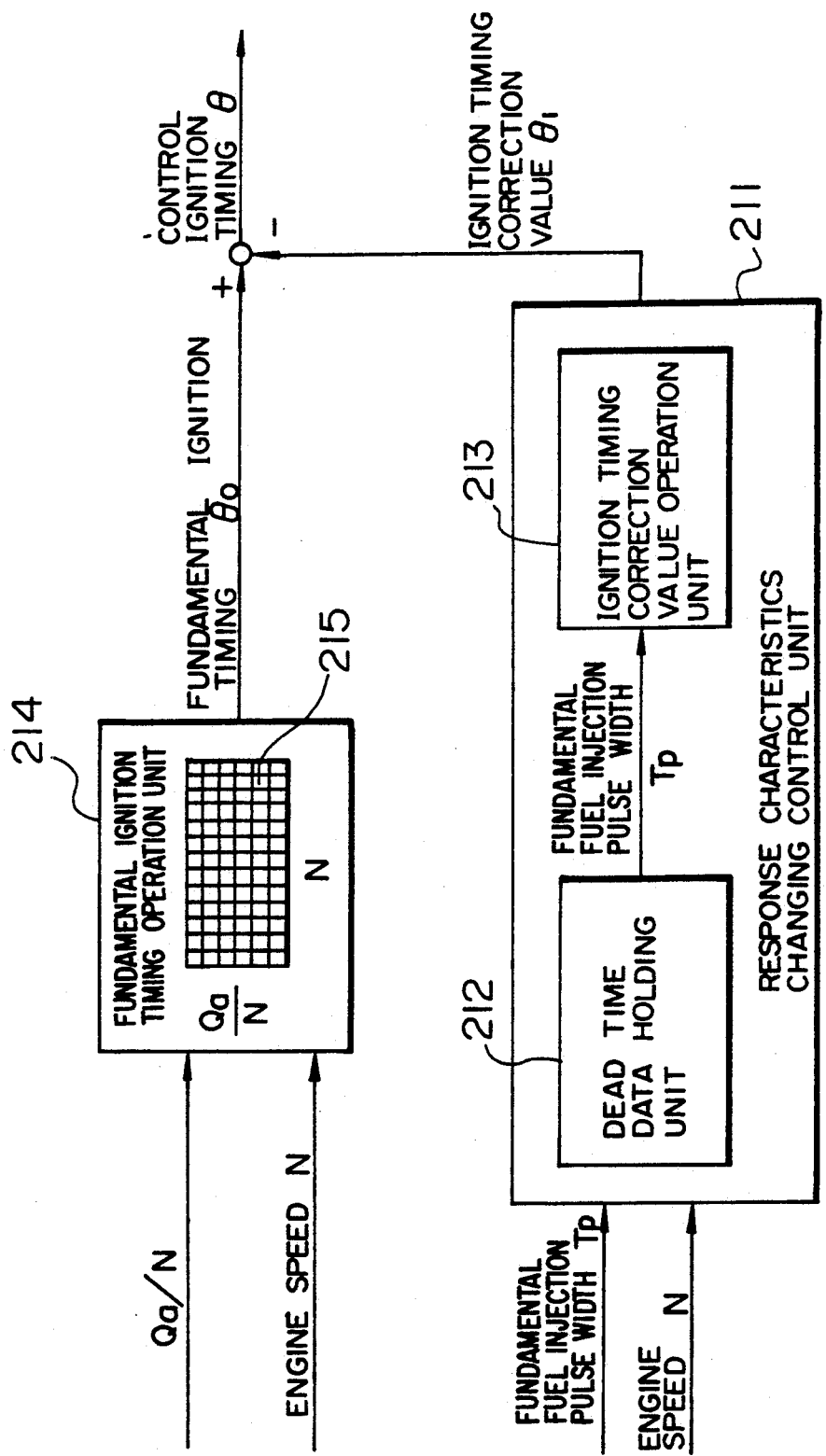
FIGS. 10 through 12 are block diagrams showing essential components of a second embodiment of an ignition timing correction device.

FIG. 10 is a block diagram showing a second embodiment of the ignition timing correction device of the present invention. As shown in FIG. 10 response characteristics changing control unit 211 includes a dead time data holding unit 211 and an ignition timing correction value operation unit 213. The ignition timing correction value operation unit 213 corresponds to a portion of the response reference model of the embodiment of FIG. 5 from which the dead time element 46 and the map 45 are omitted. After the dead time data holding unit 212 holds the fundamental fuel injection pulse width $T_p$ value during the dead time from the time when the value of $T_p$ is taken until the torque is generated, it outputs value the held fundamental value to the ignition timing correction value operation unit 213. Although the input is the estimated torque value $T_q$ in the first embodiment, the input is the fundamental fuel injection pulse width $T_p$ in the second embodiment. Since both $T_p$ and $T_q$ can be obtained by multiplying $Q_a/N$ by a constant, $T_p$ may be used as an alternative of torque value. The dead time data holding unit 212 includes a portion which does not determine the dead time from the map, but calculates the dead time. The unit 212 also reads the engine speed N to calculate the dead time. A method of calculating the dead time by using the engine speed N will be described hereafter. The ignition timing correction value operation unit 213 receives the fundamental fuel injection pulse width $T_p$, which is delayed for the above mentioned dead time, as an input and outputs the ignition timing correction value $\theta_1$.

In the fundamental ignition timing operation unit 214, a final ignition timing $\theta$ is obtained by subtracting the above mentioned ignition timing correction value $\theta_1$ from the fundamental ignition timing $\theta_0$ which is obtained from a ratio of intake air amount/engine speed ($Q_a/N$) and the engine speed N with reference to the two dimensional memory map 215.

Although the fundamental fuel injection pulse width $T_p$ is inputted in the second embodiment, the above mentioned ratio $Q_a/N$ may be inputted. Alternatively, the intake air amount $Q_a$ and the engine speed N may be inputted to determine the above mentioned value of $Q_a/N$ by using the inputted values and thereafter the dead time and the ignition timing correction value $\theta_1$ may be determined.

Figure 11:
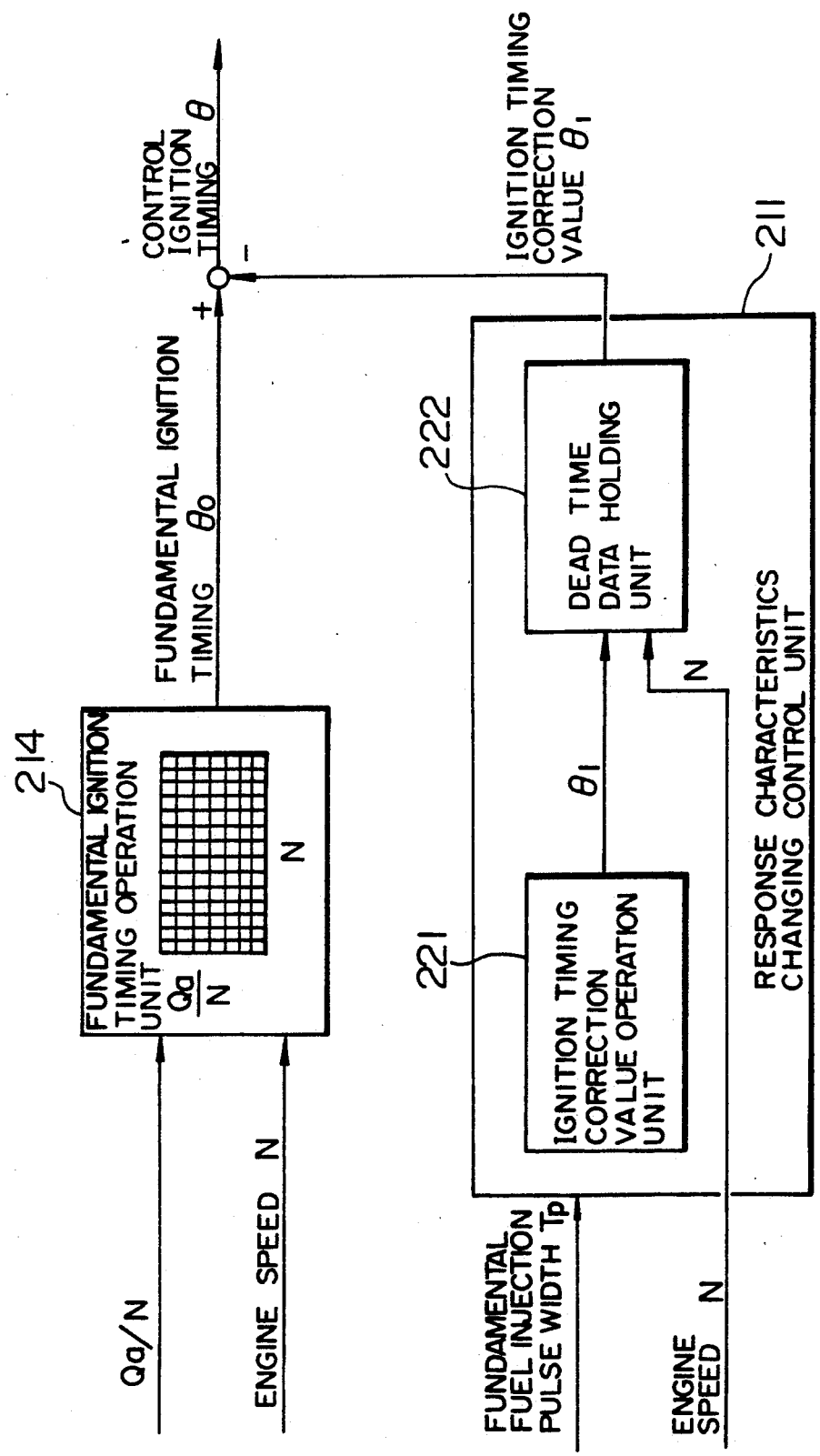

A modification of the second embodiment is shown in FIG. 11. It is apparent from comparison of the structure of FIG. 10 with that shown in FIG. 11 that the dead time data holding unit 222 and the ignition timing correction value operation unit 221 are reversed. In other words, the ignition timing correction value $\theta_1$ is determined by using the fundamental fuel injection pulse width $T_p$ in the ignition timing correction value operation unit 221. The dead time data holding unit 222 holds the obtained ignition timing correction value $\theta_1$ during the torque generation dead time and after the dead time outputs the ignition timing correction value $\theta_1$ which will be an input from the response characteristic changing control unit 211. The control ignition timing $\theta$ may be obtained by subtracting the above mentioned ignition timing correction value $\theta_1$ from the fundamental ignition timing $\theta_0$ similarly to the case of FIG. 10.

The details of operation will now be described.

In the structure shown in FIG. 10, the dead time data holding unit 212 determines the torque generation dead time from the rise-up of the fundamental fuel injection pulse width $T_p$ to torque generation mainly based on the engine speed N during acceleration of a vehicle. The torque generation dead time is a period of time required for the engine to rotate substantially one time (crank angle of 360°) since a torque does not occur until intake, compression and expansion strokes have passed from the rise-up of the fundamental fuel injection pulse width $T_p$ as mentioned above. Therefore, the dead time, that is the time corresponding to 360° crank angle of the engine is expressed as follows:

$$L = \frac{60}{N} \quad (6)$$

wherein L denotes torque generation dead time (second), N denotes rpm.

The fundamental fuel injection pulse width $T_p$ which is input data is held during the thus obtained torque generation dead time L and thereafter the value $T_p$ is fed to the ignition timing correction value operation unit 213, which obtains an ignition timing correction value by the following transfer function.

$$G_c(s) = \frac{B(s)}{A(s)} \quad (7)$$

wherein s denotes a Laplace operator; $G_c(s)$ denotes a transfer function of the ignition timing correction value operation unit 213; B(s) denotes a polynominal which is a numerator of the transfer function; A(s) denotes a polynominal which is a denominator of the transfer function. Although both A(s) and B(s),may be high-order polynominals they are quadratic and obtain control characteristics including the characteristics of an object (second-order lag element) in consideration of simplicity of operation. The structure shown in FIG. 11 is similar to that of FIG. 10.

Figure 12:
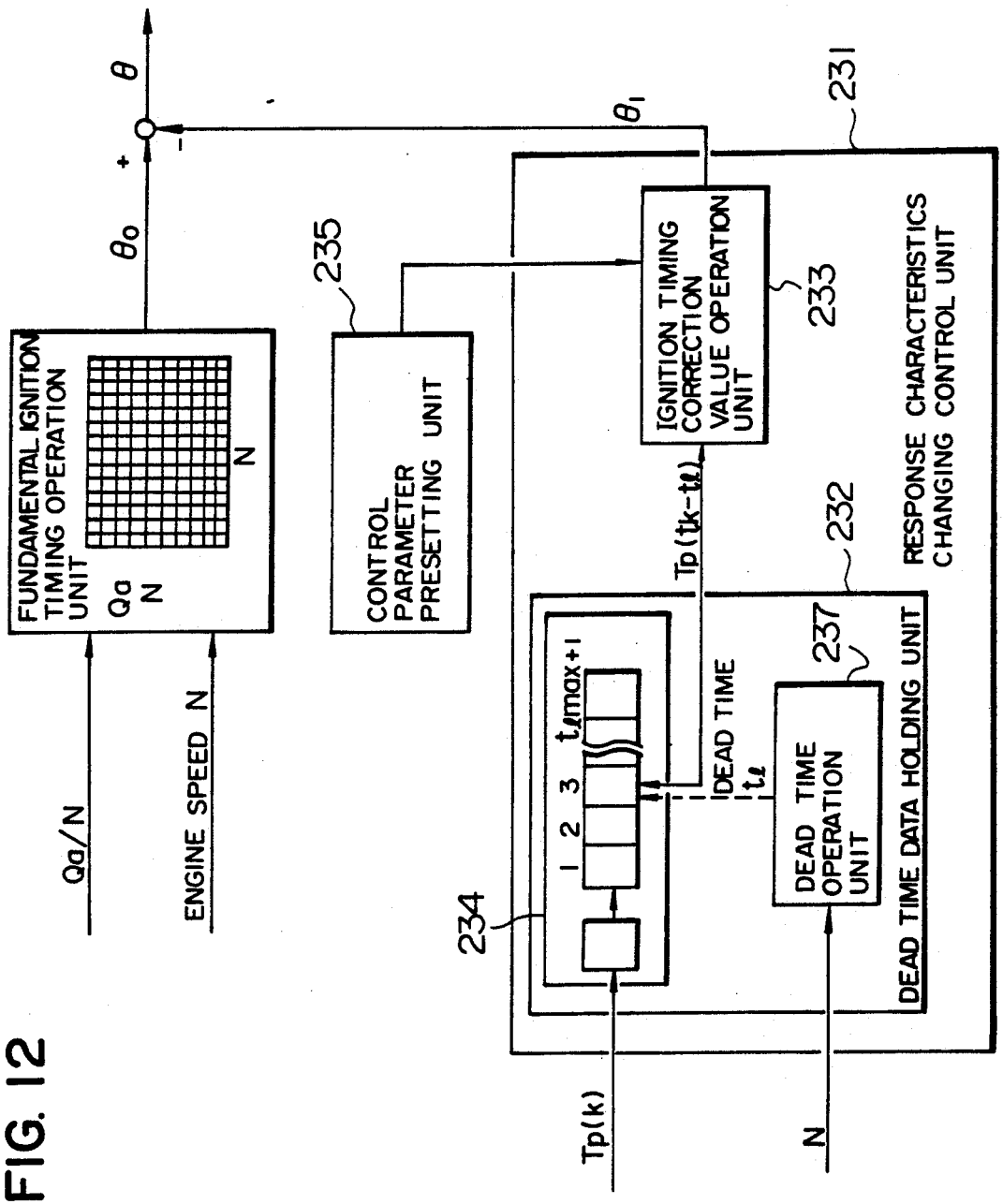

A further modification of the second embodiment of FIG. 11 is shown in FIG. 12. In this modification, there is shown an example of the inner structure of the dead time data holding unit 232. Desired response characteristics are obtained by changing the control parameters of the ignition timing correction value operation unit 233. The details will be described hereafter.

In the second embodiment, the dead time data holding units 212, 222, 232 are single components and the drive-line system transfer function 47 which is a second order oscillation system and the ignition timing correction value operation unit 43 are combined into the ignition timing correction value operation units 213, 221 and 233 as shown in FIGS. 10 through 12 while the drive-line system transfer function 47 and the dead time element 46 are combined in the virtual feedback response estimate unit 42 and the first-order system transfer function including a control parameter $\beta$ is realized by the corrected ignition timing calculation unit 43 in the first embodiment.

A time corresponding to 360° crank angle is determined in the second embodiment as mentioned above while the torque generation dead time from the input of the fundamental fuel injection pulse width $T_p$ to the generation of an engine torque is prelimarily stored in the memory map for the engine speed and the dead time is retrieved from the memory map for the engine speed N during driving in the first embodiment. Since the cycle of operation is $\Delta T$, it is converted to a time (digital data of the number of pulses) when a digital computer can perform an operation as follows:

$$t_l = \left[\frac{L}{\Delta T}\right] = \left[\frac{60}{N\Delta T}\right] \quad \text{(digital value)} \tag{8}$$

wherein the mark { } denotes a value which is an integer. This conversion is carried out by the dead time operation unit 237 in case of FIG. 12.

If current time is assumed as $t_k$ and a torque is generated at time $t_l$, it is understood that a fundamental fuel injection pulse width $T_p$ based on data at time $(t_k - t_l)$ is required. This will be designated as $T_p(t_k - t_l)$ hereafter. It is necessary to hold input data $T_p$ during a period of time until it reaches that time even if the dead time is found as mentioned above. A data holding memory 234 shown in FIG. 12 is a memory for holding the data and has a memory capacity $(t_l max + 1)$ which is capable of coping with a minimum engine speed $N_L$. If new fundamental fuel injection pulse width data $T_p(k)$ at the time $t_k$ is inputted, the data in the data holding memory 234 shown in FIG. 12 is shifted rightward one by one and the data $T_p(t_k)$ at the time $t_k$ is held at the leftmost end of the memory 234. Based on the dead time t obtained by the afore-mentioned dead time operation unit 237, $T_p(t_k - 1)$ in the data holding memory 234 is retrieved and is fed to the ignition timing correction value operation unit 233. Furthermore, $T_p(t_{k-l}-1)$ before one time is also retrieved and is fed to the ignition timing correction value operation unit 233. The ignition timing correction value operation unit 233 calculates an ignition timing correction value based on the following formula:

$$\theta_1(t_k) = \frac{1}{1 + \Delta T \zeta^* + \omega_n^{2*}} [(2 + \Delta T \cdot \zeta^*) \theta_1(t_{k-1}) - \tag{9}$$

$$\theta_1(t_{k-2}) + K_p \cdot K_{ea} \cdot \{(K_2 \cdot \Delta T +$$

$$K_4(\Delta T)^2) T_p(t_k - t_l) - K_2 \Delta T \cdot T_p(t_k - t_{l-1})\}]$$

wherein, $$\zeta^* = 2 \cdot \zeta \cdot \omega_n + K_{ea} K_1$$

$$\omega_n^{2*} = \omega_n^2 + K_{ea} \cdot K_3$$

As represented by the above formula, $T_p(t_k - t_l)$, $T_p(t_k - t_{l-1})$ are used and correction values $\theta_1(t_{l-1})$, $\theta_1(t_{k-2})$ which are determined before one time are also used.

If the control parameters from the control parameter presetting unit 255 are desired to be changed, for example, values of $K_1$ through $K_4$ in the above formula are determined based on the table shown in FIG. 26 and are inputted to the above formula to determine the ignition timing correction value $\theta_1(t_k)$. Then the controlled ignition timing value $\theta(t_k)$ is determined from the above ignition timing correction value $\theta_0(t_k)$.

Now a third embodiment of the present invention will be described.

FIG. 13 is a block diagram showing the third embodiment of the ignition timing control device in the response characteristic changing control system of the present invention. The present embodiment is identical with the second embodiment shown in FIG. 10 except that a filtering unit 311 is provided before the stage of the response characteristic changing control unit 211. The filtering unit 311 performs various delay filtering processings by using the fundamental fuel injection pulse width $T_p$ and thereafter feeds the result to the above mentioned dead time data holding unit 212. The structure after the stage of the dead time data holding unit 212 is similar to that of the above-mentioned embodiment.

Although the fundamental fuel injection pulse width $T_p$ is inputted to the filtering processing unit 311 in the structure of the present invention, $(Q_a/N)$ may be inputted thereto as mentioned above. As a modification, the filtering processing unit 311 may be inserted between the dead time data holding unit 212 and the ignition timing correction value operation unit 213.

Effects of the filtering processing in the third embodiment are as follows: The measured intake air amount is air flow passing a throttle and the amount of the air involved in generation of torque is an amount of air which is actually fed into a cylinder. In an engine in which the distance between a throttle valve and an intake port is long or, an air reservoir chamber or a surge tank is provided within the intake manifold, there may be a difference between the measured intake air amount and the amount of air flowing into a cylinder due to inertia of the intake air. In order to obtain the cylinder flowing air amount based on the throttle passing air amount, a filtering processing is utilized for minimizing an influence on the difference. Specifically this filtering processing is realized by, for example, a first-order lag system $G_p(s)$ represented by the equation as follows:

$$G_p(s) = \frac{1}{1 + T(N)s} \tag{10}$$

wherein $T(N)s$ denotes a constant determined as a function of the engine speed value N. The above mentioned dead time data holding unit 212 and the ignition timing correction value operation unit 213 operate similarly to the second embodiment.

Details of the third embodiment will now be described. $T_{ps}$ is obtained by filtering processing the fundamental fuel injection pulse width $T_p$ as shown in FIG. 15.

Figure 15:
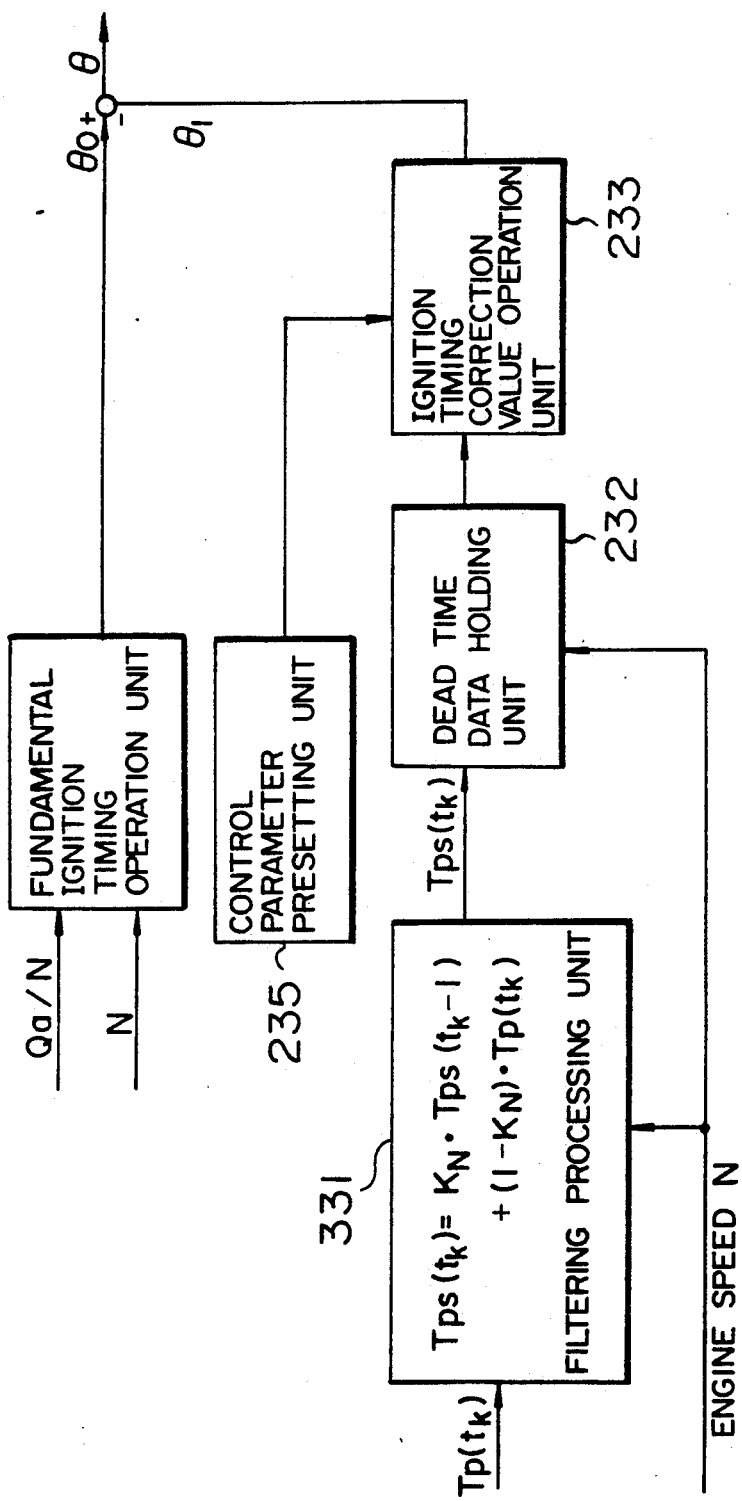

The filtering processing shown in FIG. 15 is performed by making data discrete so that the first-order lag system $G_p(s)$ may be operated by a digital computer.

$$T_{ps}(t_k) = K_N \cdot T_{ps}(t_{k-1}) + (1 - t_{KN})T_p(t_k) \tag{11}$$

wherein $$t_{KN} = \frac{1}{\Delta T \cdot a_N + 1} \tag{12}$$

-continued $$a_N = -\frac{1}{200} N(K) \quad (13)$$

$N(t_k)$: engine speed at time $t_k$.

$K_N$ representative of the strength of filtering processing is a function of the engine speed. For example, the strength of filtering processing is decreased for higher engine speed and conversely the strength of filtering processing is increased for lower engine speed. In other words, a time constant $T(N)$ of formula (10) is decreased or increased for higher or lower engine speed, respectively. $T_{ps}(t_k)$ which is obtained by formulas (11) through (13) is taken to a dead time data holding unit 232 and will be subsequently used for operation similarly to the data treated as $T_p$ in the afore-mentioned embodiment.

Now a fourth embodiment of the ignition timing correction device in the response characteristic changing control system of the present invention will be described.

Figure 16:
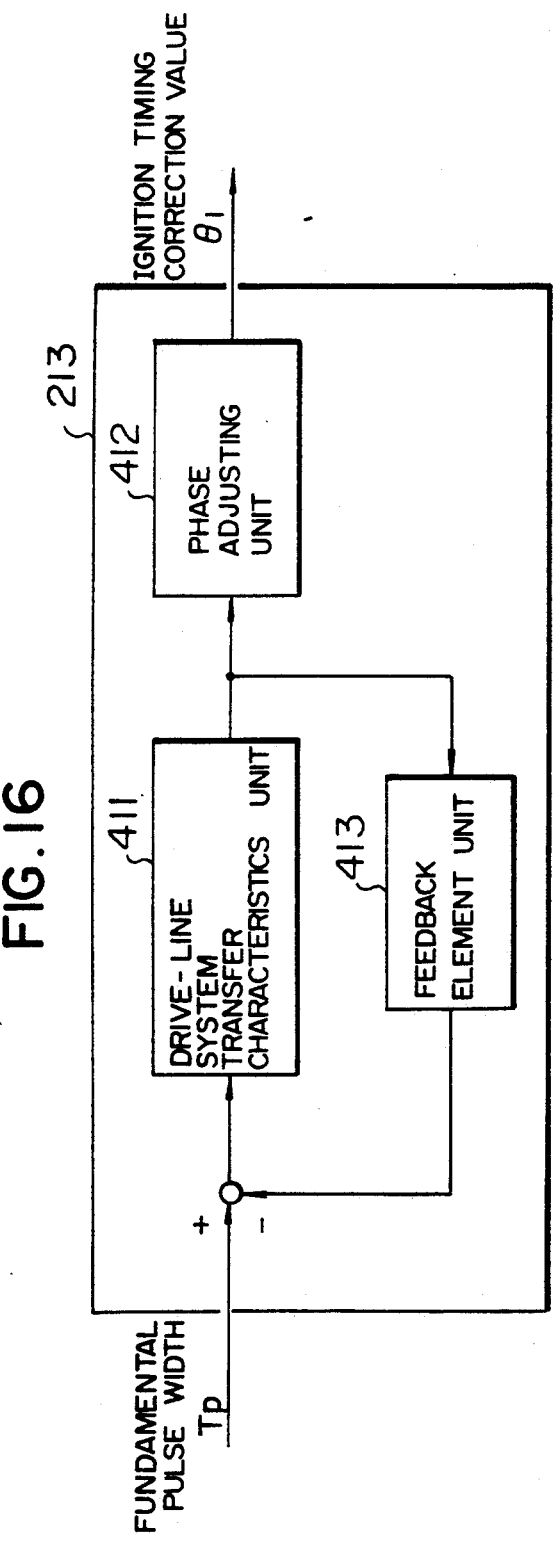
FIGS. 16 through 18 are block diagrams showing essential components of a fourth embodiment of an ignition timing correction device.

FIG. 16 is a block diagram of the inner structure of the fourth embodiment of the ignition timing correction value operation unit. The ignition timing correction value operation unit 213 corresponds to the unit 213 in the second embodiment of FIG. 10. In the drawing, a reference numeral 411 denotes a drive-line system transfer characteristic unit representative of vehicle acceleration (output) characteristics for engine torque (input). This unit corresponds to the drive-line system transfer function 47 (refer to FIG. 5) in the first embodiment. A phase adjusting unit 412 corresponds to the corrected ignition timing calculating unit 43 (refer to FIG. 5) in the first embodiment. A feedback element unit 413 calculates a virtual feedback value of torque by using an output value from the drive-line system transfer characteristic unit 411.

A value which is obtained by subtracting the virtual feedback value of the torque from a value $T_p$ of the input to the ignition timing correction value operation unit 213 is inputted to the drive-line system transfer characteristic unit 411. In a modification of the structure shown in FIG. 16, the feedback element unit 413 may be omitted. In this case, the output of the phase adjusting unit 412 is not only treated as an output of the feedback element unit 413, but also is treated as a virtual feedback value of torque for use of feedback. The inner structure of the ignition timing correction value operation unit is shown in the present embodiment if each component in FIGS. 16 and 17 can be expressed by a transfer function, each of Figures could be expressed by one transfer function.

Figure 17:
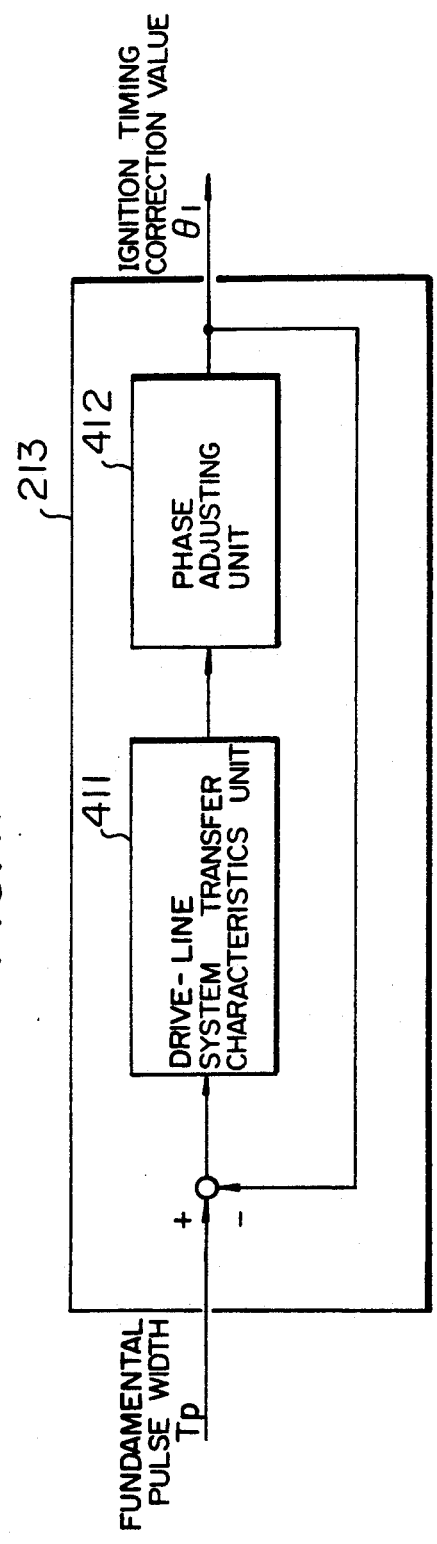

Operation of the fourth embodiment will be described. The whole system in the ignition timing correction value operation unit 213 shown in FIGS. 16 and 17 is such that both the numerator and the denominator can be expressed by transfer functions each having a second-order element. That is, the drive-line system transfer characteristic unit 411 exhibits a dynamic characteristic of acceleration surging effect and the like and is represented by following second-order transfer function for simplicity of operation.

$$G_{ea}(s) = \frac{K_{ea}}{s^2 + 2\zeta\omega_n s + \omega_n^2} \quad (14)$$

wherein $G_{ea}(s)$ is the transfer function of the drive-line system transfer characteristic unit 411 and $K_{ea}$, $\zeta$, $\omega_n$ denote the above mentioned parameters.

The phase adjusting unit 412 is a first-order transfer function as follows:

$$G_{412}(s) = K_2 s + K_4 \quad (15)$$

wherein $k_2$ and $K_4$ denote control parameters which designers can optionally preset and their values can be optionally selected by drivers.

Similarly, a feedback element unit 413 is a first-order transfer function as follows:

$$G_{413}(s) = K_1 s + K_3 \quad (16)$$

wherein $K_2$ and $K_3$ are control parameters which designers can optionally preset and their values can be optionally selected by drivers.

In order to make the phase adjusting unit 412 equivalent to the feedback element unit 413 as shown in FIG. 17, the following formula relationship should be established in formulas (15) and (16).

$$\left. \begin{array}{l} K_1 = K_2 \\ K_3 = K_4 \end{array} \right\} \quad (17)$$

That is, $G_{412}(s) = G_{413}(s)$.

The transfer functions in the drive-line system transfer characteristic unit 411, phase adjusting unit 412 and the feedback element unit 413 can be combined into single transfer function as follows:

$$G_c(s) = \frac{K_{ea}(K_2 s + K_4) \cdot K_p}{s^2 + (2\zeta\omega_n + K_{ea} \cdot K_1)s + \omega_n^2 + K_{ea} \cdot K_3} \quad (18)$$

wherein $K_p$ denotes a $T_p$-ignition timing conversion constant which means a form of whole gain.

Formula (18) is represented as $G_c(s)$ since it is same as the general form of the transfer function shown in formula (7) of the second embodiment.

Since formulas (14) through (16) can be combined into a single transfer function as formula (18) as mentioned above, a structure shown in FIG. 16 in which each of formulas (14) through (16) is individually calculated, a structure shown in FIG. 17 in which two formulas are combined or a structure in which operation represented by formula (18) is performed is possible.

Figure 18:
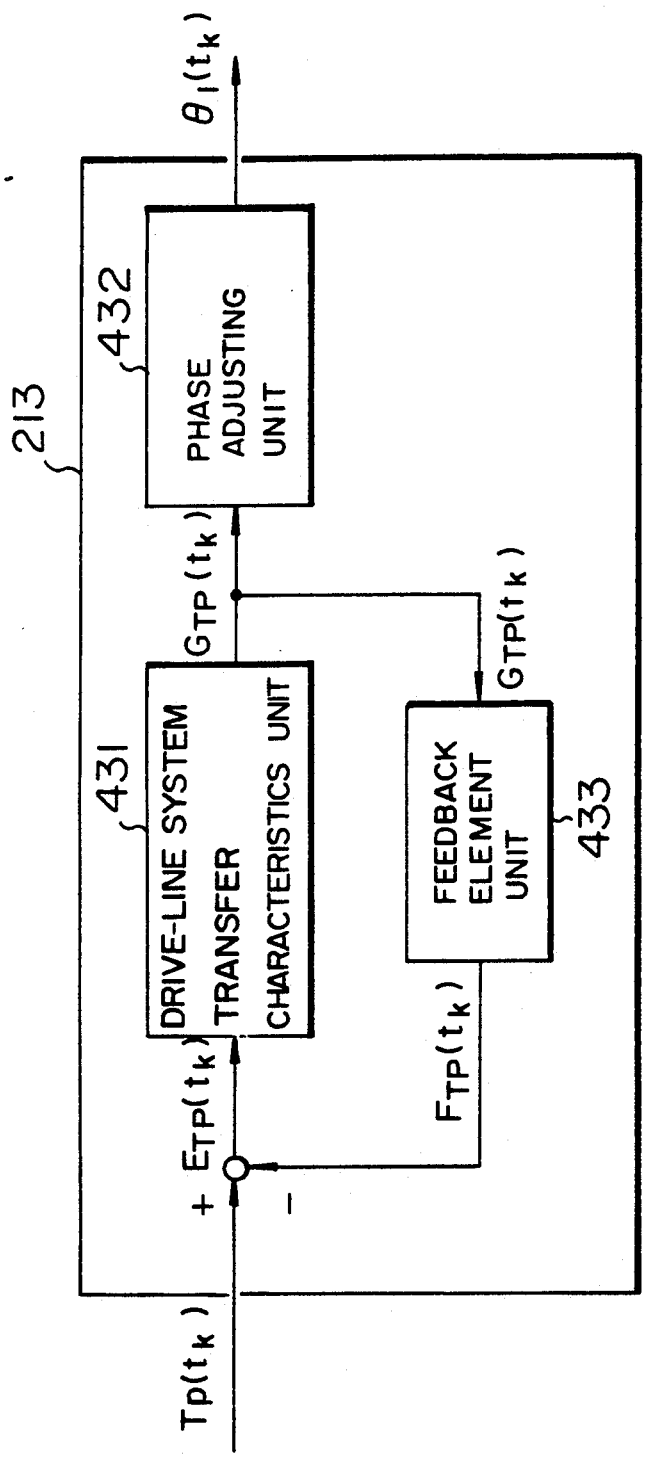
Figure 19:
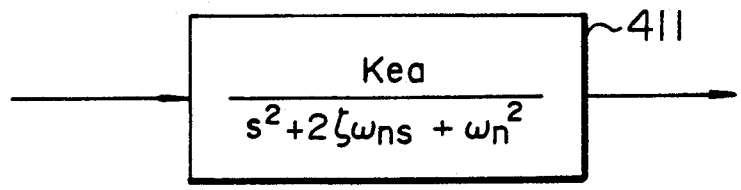
FIGS. 19 through 22 are block diagram showing essential components of the fourth embodiment of the present invention.

Operation of the fourth embodiment will be described. In the present embodiment, the fundamental fuel injection pulse width $T_p$ is inputted and the ignition timing correction value $\theta_1$ is outputted as shown in FIG. 18. The drive-line system transfer characteristic unit 431 calculates $G_{TP}$ by using $E_{TP}$ obtained from the following formula.

$$E_{TP}(t_k) = T_p(t_k - t_l) - F_{TP}(t_k) \quad (19)$$

wherein $T_p(t_k - t_l)$ is expressed using $T_p$ which is $T_l$ time before in consideration of dead time.

By making formula (14) discrete the drive-line system transfer characteristic unit 431 can operate as follows:

$$G_{TP}(t_k) = \frac{1}{1 + 2\zeta\omega_n \Delta T + \omega_n^2 (\Delta T)^2} [(2 + \quad (20)$$

$$2\zeta\omega_n \Delta T) G_{TP}(t_{k-1}) - G_{TP}(t_{k-2}) + K_{ea} \cdot (\Delta T)^2 \cdot E_{TP}(t_k)]$$

A feedback element unit 433 determines a virtual feedback value $F_{TP}$ by making formula (16) discrete as follows:

$$F_{TP}(t_k) = \left(\frac{K_1}{\Delta T} + K_3\right) G_{TP}(t_k) \frac{K_1}{\Delta T} G_{TP}(t_{k-1}) \quad (21)$$

wherein $K_1$ and $K_3$ are determined from a Table shown in FIG. 26. Alternatively, simplification of calculation may be achieved by assuming $K_3 = 0$.

Figure 25:
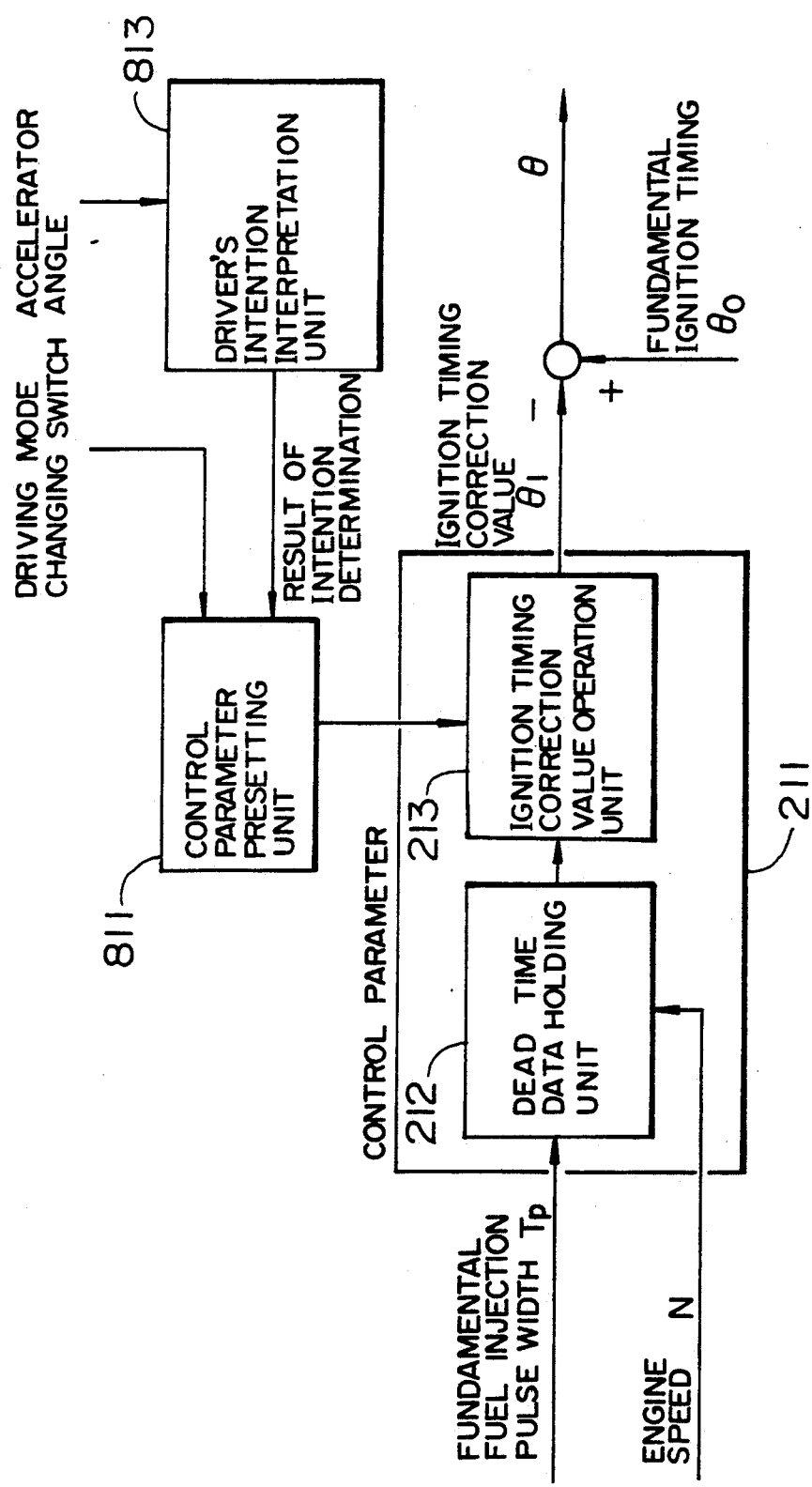

A phase adjusting unit 432 determines the ignition timing correction value $\theta_1$ from $G_{TP}$ by making formula (15) discrete as follows:

$$\theta_1(t_k) = \left(\frac{K_2}{\Delta T} + K_4\right) G_{TP}(t_k) - \frac{K_2}{\Delta T} G_{TP}(t_{k-1}) \quad (22)$$

wherein $K_2$ and $K_4$ are determined as shown in FIG. 25. Alternatively, simplification of calculation may be achieved by assuming $K_4 = 0$.

As is apparent from comparison of formula (21) with formula (22), the structure shown in FIG. 17 is provided since the phase adjusting unit 432 and the feedback element unit 433 would be equivalent with each other if control parameters are preset as shown in FIG. 18. Formulas (20), (21) and (22) are combined into a single formula (9). That is, an operation performed by the drive-line system transfer characteristic unit 43', the phase adjusting unit 432 and the feedback element unit 433 would be equivalent to operation performed by the ignition timing correction operation unit 233 in the above mentioned second embodiment.

Since $G_{TP}$ which is information relevant to the acceleration in a longitudinal direction of a vehicle may be obtained in the above mentioned embodiment, the acceleration can be indirectly measured by using GTP even in an automobile electronic control system having no acceleration sensor.

Figure 20:
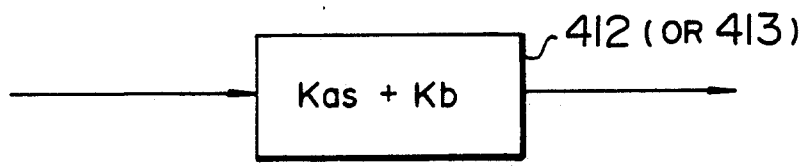

It is possible to adequately simulate the vibration of the vehicle's longitudinal acceleration in response to the abrupt rise-up of torque by representing the drive-line system transfer characteristic unit 411 shown in FIGS. 16 and 17 as a second-lag transfer function and by treating as a second-order oscillation system the characteristics of the driving system and vehicle system which are control objects. Furthermore, by expressing the transfer functions of the phase adjusting unit 412 and the feedback element unit 413 as a first-order transfer function as shown in FIG. 20 in a simple and easy manner, there is an effect that the number of control parameters is reduced and presetting of desired characteristics is made easier.

$K_{ea}$, $\zeta$, and $\omega_n$, etc. in the above mentioned formula (20) have been preliminarily determined. Therefore, the constants are compiled as follows:

$$a_1 = \frac{1}{1 + 2\zeta\omega_n \Delta T + \omega_n^2(\Delta T)^2} \quad (23)$$

$$a_2 = 2 + 2\zeta \cdot \omega_n \cdot \Delta T \quad (24)$$

$$b_1 = K_{ea}(\Delta T)^2 \quad (25)$$

the above mentioned formula (20) may be changed into such a form that it can be easily operated.

$$G_{TP}(t_k) = a_1\{a_2 T_{TP}(t_{k-1}) - G_{TP}(t_{k-2}) + b_1 E_{TP}(t_k)\} \quad (26)$$

The above mentioned simplification of operation by compiling constants is also applicable to formulas (9), (21) and (22).

Figure 21:
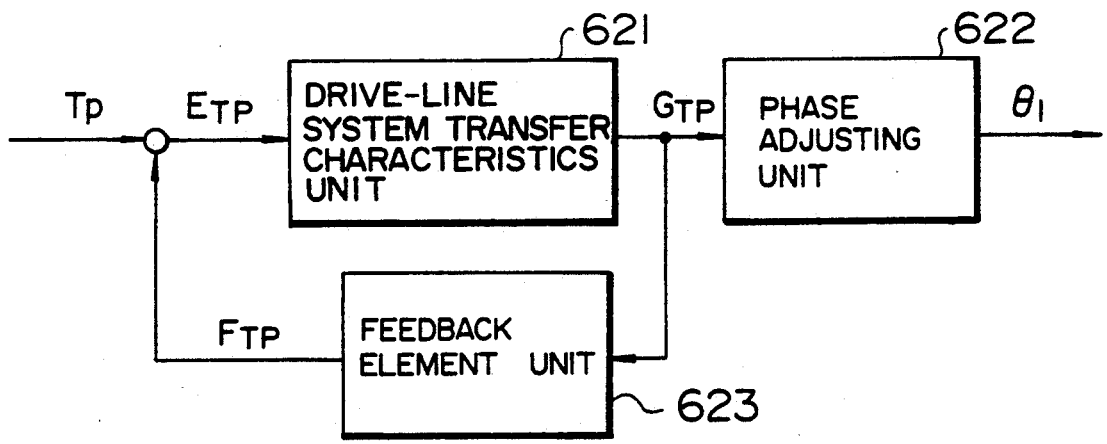

FIG. 21 shows a modification of the ignition timing correction value operation unit 213 shown in FIG. 18. Units 621 through 623 correspond to the drive-line system transfer characteristic unit 411, the phase adjusting unit 412 and the feedback element unit 413, respectively.

The feedback element unit 623 performs an operation assuming $K_3 = 0$ in formula (21) as follows:

$$F_{TP}(t_k) = \frac{K_1}{\Delta T} (G_{TP}(t_k) - G_{TP}(t_{k-1})) \quad (27)$$

The phase adjusting unit 622 performs an operation assuming $K_x = 0$ in formula (22) as follows:

$$\theta_1(k) = \frac{K_2}{\Delta T} (G_{TP}(t_k) - G_{TP}(t_{k-1})) \quad (28)$$

Figure 22:
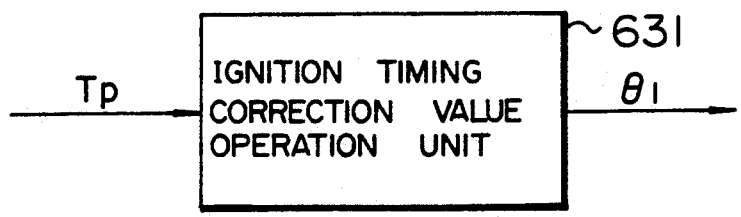

It is possible to compile formula into one formula for operation as shown in FIG. 22. In this case, the following operation is achieved.

$$\theta_1(t_k) = \frac{1}{1 + \Delta T \zeta^* + \omega_n^2} [(2 + \Delta T \cdot \zeta)\theta_1(t_{k-1}) - \quad (29)$$

$$\theta_1(t_{k-2}) + K_p \cdot K_{ea} \cdot \{K_2 \cdot \Delta T \cdot T_p(t_k - t_l) -$$

$$K_2 \cdot \Delta T \cdot T_p(t_k - t_{l+1})$$

In accordance with the fourth embodiment, there is an effect that the number of control parameters to be preset is reduced and the control parameters are reduced to only one parameter by letting $K_1 = K_2$ so that presetting becomes easier.

Now, an example of learning a torque generation dead time in the response characteristic changing control system of the present invention will be described. The conditions which establish the premises of the present embodiment will be described in more detail prior to a detailed description.

If a period of time (dead time) from the rise-up time of $Q_a/N$ on acceleration to the rise-up time of $Q_a/N$ on acceleration to the rise-up time of torque is preliminarily preset so that it is proportional to a function or a reciprocal of the engine speed value by considering the dynamic characteristics of an engine and a vehicle as a dead time system plus a second-order oscillation system and by performing a feedforward control in which a ratio of intake air amount/engine rotational number ($Q_a/N$) is inputted and an ignition timing correction value is outputted, the acceleration surging can be suppressed in a good timing. However, in this method, an air-fuel mixture would become less lean than a required air-fuel ratio value if an abrupt acceleration is requested. This may cause a misfire that two or three cycles of combustion fail in an initial acceleration phase. If such a misfire occurs on an initial acceleration, the above mentioned period of time (dead time) till the rise-up time of the torque is extended so that an efficient torque control cannot be accomplished.

A lean air-fuel mixture will sometime delay the rise-up of the torque even though a misfire does not occur. A lean air-fuel mixture generates a delay during acceleration mainly due to the fact that fuel injected by an injector is not directly fed into a cylinder but a part of the fuel adheres to the inner wall of an intake manifold to form a film or stays in the intake manifold. The degree of the generation of lean air-fuel mixture differs since the amount of the fuel which is separated from the intake manifold wall and carried by increased air flow just after acceleration depends on the fuel which has adhered on the intake manifold wall in the form of a film just before acceleration. In such a manner, the lag time (dead time) of the rise-up of torque varies with running conditions or acceleration degree, etc. and so a control of only the dead time may be insufficient. A problem also resides in that there may be a difference between the preset dead time and the actual dead time due to change with time and variations in parts even if the above dead time is preliminarily preset by using various running conditions and acceleration degree, etc. as parameters.

In the embodiment which will be described hereafter, the dead times are determined based on driving data representative of running conditions and acceleration. The data on the running conditions includes measured data involved in engine control such as engine speed, throttle opening, intake air amount or coolant temperature or data operated based on these parameters (for example, fundamental fuel injection pulse width, etc. or appropriate combinations thereof). The driving data representative of acceleration degree includes data such as a differentiated value or differential value of throttle opening, a differentiated value or differential value of vehicle speed, and a differential value of engine speed and the combinations thereof.

The reason why the dead times are preset based on driving data representative of running conditions and acceleration degree is that a period of time taken until actual rise-up of torque depends on the difference in running condition as mentioned above if the dead time is considered as a function of only engine speed and therefore the dead time cannot be represented by only engine speed. In the present embodiment, learning control is achieved for a difference in dead time due to change with time or variations of parts, etc. as will be described hereafter.

Retrieving where the driving condition is located on a table showing the relation between parameters representative of running condition and acceleration degree and the dead times is carried out from measured data values of running conditions and acceleration degree. A value which is obtained by the above retrieving is stored as a dead time (before learning) and the difference between this stored value and a value of actual dead time determined by the above mentioned various embodiments is operated to determine change of dead time with time. The determined dead time is stored in a memory area different from the memory area of the above mentioned dead time at an initial state. If the driving conditions thereafter become substantially equal to the above mentioned value of data representative of running conditions and the value of data representative of the acceleration, a dead time used for control is preset by using the learning stored dead time and the dead time at the initial state.

By doing so, a difference in dead time can be automatically corrected even when there is a change with time or variations in parts. Actual dead time for the lag of torque rise-up due to the fact that the air-fuel mixture becomes lean during an abrupt acceleration is determined by the response of engine speed and is stored. When the conditions are the same, a difference in torque rise-up can be absorbed by using the dead time which has been determined.

Figure 23:
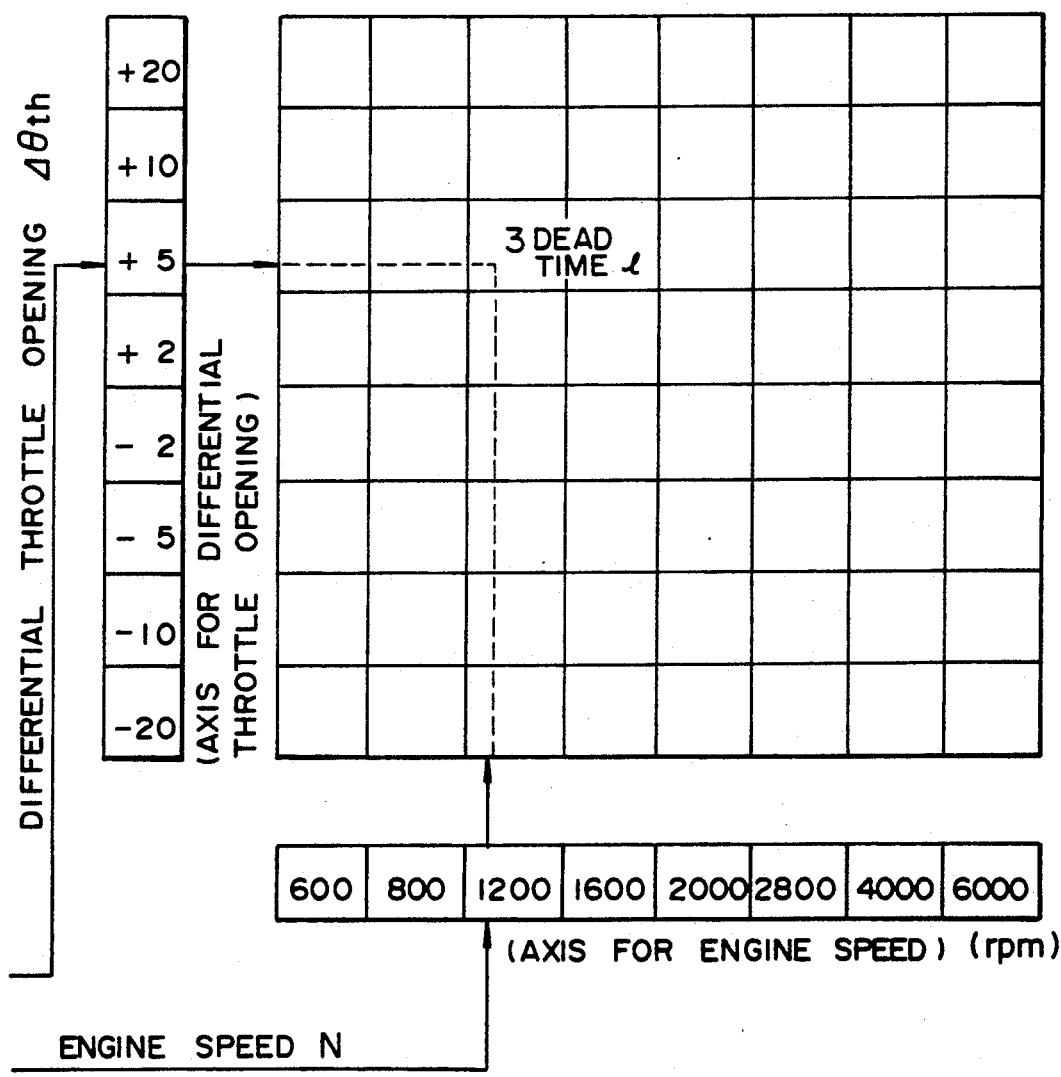
FIG. 23 is a view showing a lag time table used in a fifth embodiment of an ignition timing correction device of the present invention.

In the embodiment of learning control of dead time, dead times are represented in a table by using engine speed N as a driving data representative of driving conditions and by using a differential value $\Delta\theta_{th}$ of throttle opening as a driving data representative of acceleration degree as shown in FIG. 23. The engine speed N is calculated on the basis of pulses generated by the crank sensor 28 shown in FIG. 3. The differential value of the throttle opening is determined by converting analog signals obtained by the throttle opening sensor 24 shown in FIG. 3 into digital values in an A/D convertor in the interface 34 as follows:

$$\Delta\theta_{th} = \theta_{th}(t_k) - \theta_{th}(t_{k-1}) \qquad (30)$$

wherein $\theta_{th}(t_{k-1})$ is a digital value of throttle opening at operation time $t_{k-1}$ and is stored in RAM 33 (refer to FIG. 3). Therefore, $\Delta\theta_{th}$ is a throttle opening which is changed for between time $t_{k-1}$ and time $t_k$.

A relevant dead time is calculated by retrieving the dead time table preliminarily stored in ROM 32 (refer to FIG. 3) with reference to the engine speed N and change in throttle opening $\Delta\theta_{th}$. In the present embodiment, the dead time l stored in the table at this time is an integer multiplication of a cycle $\Delta T$ (sampling cycle) for carrying out control. The dead time L (msec) is represented by dead time represented by discrete time on the table as follows:

$$L(msec) = l \cdot \Delta T \ (msecd) \qquad (31)$$

Change in throttle opening $\Delta\theta_{th}$ may be positive or negative since the throttle valve is opened or closed. Accordingly, the grid point at $\Delta\theta_{th}=0$ is disposed in the center of the drawing in the Table of FIG. 23.

As parameters for presetting a dead time, engine speed N and change in throttle opening $\Delta\theta_{th}$ are used in the above mentioned embodiment. Since a factor which is the most important to represent dead time is a period of time required for stroke, engine speed N is the best driving data the represent the period of time required for a stroke. Therefore, the engine speed value N is used as data representative of running condition. Differential value $\Delta\theta_{th}$ of throttle opening is data representative of the degree of acceleration or deceleration as well as difference in dead time due to a lean or rich air-fuel ratio generated during acceleration or deceleration which can most quickly detect the driving conditions and cannot represet the dead time with only engine speed. Therefore, the differential value $\Delta\theta_{th}$ of the throttle opening is used.

Since the difference in dead time which cannot be represented with only engine speed may be detected by the change in the throttle opening in accordance with the present embodiment, more accurate dead time can be preset. This enhances the controllability of control for changing acceleration response characteristics.

A process for using the dead time table will be described. The method of calculating an ignition timing correction value is identical with that of formula (9) in the second embodiment. For simplicity of inscription of formula, constants which can be preliminarily determined are compiled as follows:

$$\theta_1(t_k) = A_1 \cdot \theta_1(t_{k-1}) + A_2 \cdot \theta_1(t_{k-2}) + \qquad (32)$$

-continued $$B_0 \cdot T_p(t_k - t_l) + B_1 \cdot T_p(t_k - t_{l-1})$$

wherein, $$A_1 = \frac{2 + \Delta T \cdot \zeta^*}{1 + \Delta T \cdot \zeta^* + \omega^{2*}}$$

$$A_2 = -\frac{1}{1 + \Delta T \cdot \zeta^* + \omega_n^{2*}}$$

$$B_0 = \frac{K_p \cdot K_{ea} \cdot (K_2 \cdot \Delta T + K_4(\Delta T)^2)}{1 + \Delta T \cdot \zeta^* + \omega_n^{2*}}$$

$$B_1 = -\frac{K_p \cdot K_{ea} \cdot K_2 \cdot \Delta T}{1 + \Delta T \cdot \zeta^* + \omega_n^{2*}}$$

Figure 24A:
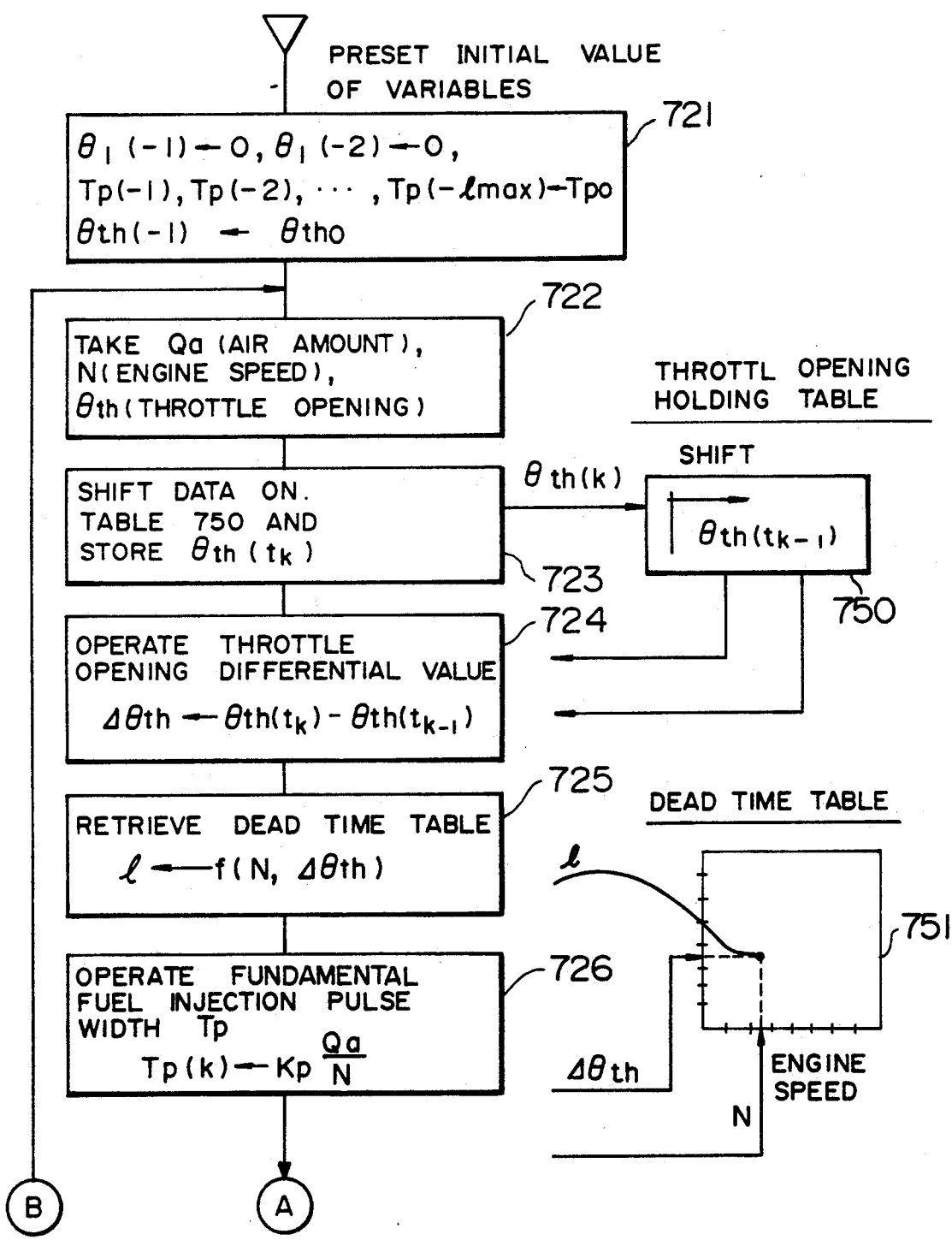
FIGS. 24A and 24B are flow charts showing the operation of the fifth embodiment.
Figure 24B:
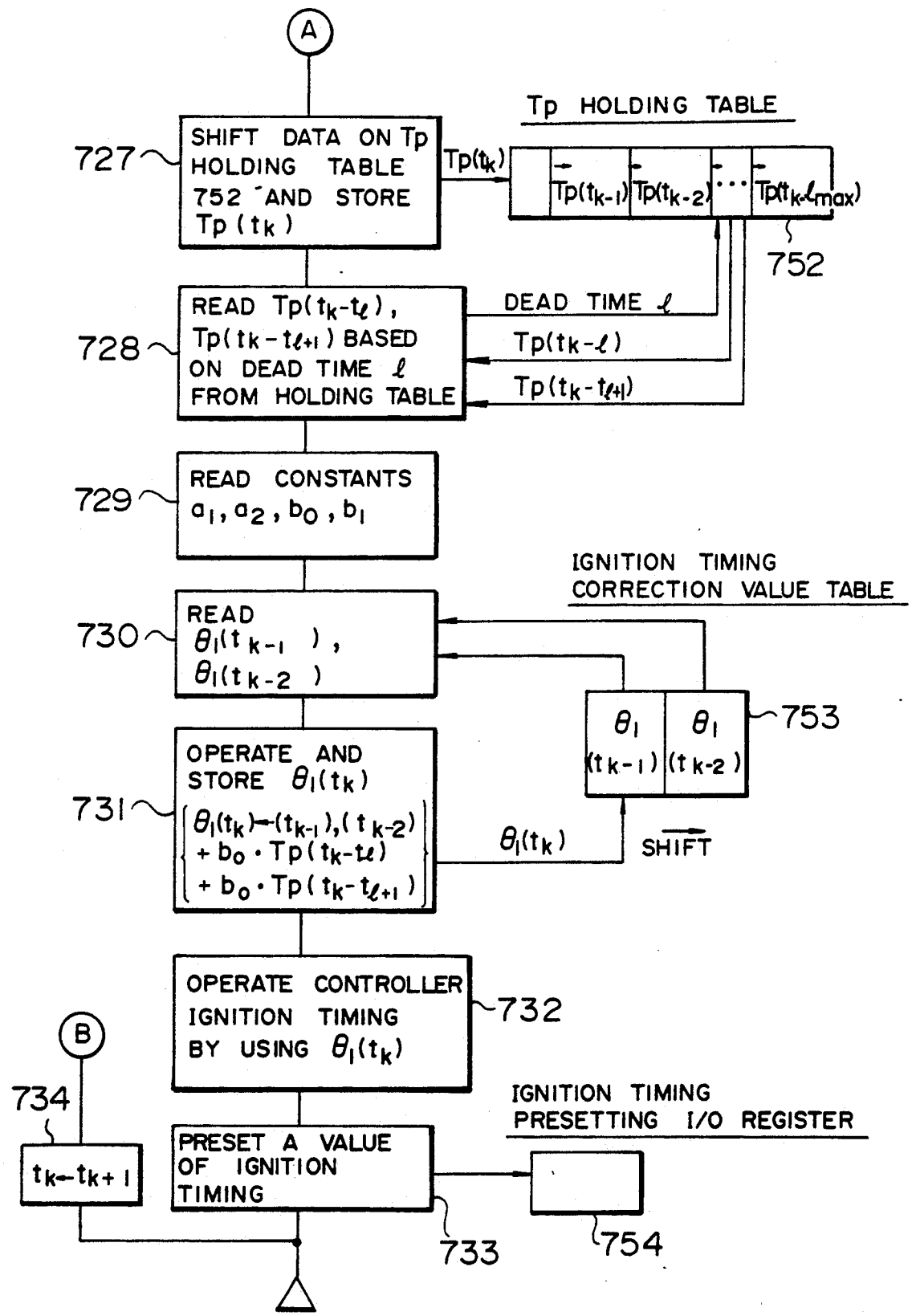

Now calculation process will be described hereafter in accordance with a flow chart shown in FIGS. 24A and 24B. Firstly, initial values of variables are preset (step 721). Presetting $\theta_1(-1)$ and $\theta_2(-2)$ to zero corresponds to clear an ignition timing correction value table 753 into zero. Predetermined values are preset into $T_p(-1), \ldots, T_p(-1\ max)$. This substitutes $T_{po}$ for (1 max+1) number of data holding units of $T_p$ holding table 752. $\theta_{tho}$ for a throttle opening holding table 750.

Air amount $Q_a$, engine speed N and throttle opening $\theta_{th}$ are taken at step 722. $\theta_{th}(t_k)$ which has been stored in the throttle opening holding table 750 is then shifted through memory address as $\theta_{th}(t_{k-1})$ and newly taken throttle opening $\theta_{th}$ is stored as $\theta_{th}(t_k)$ at step 723. Differential value of throttle opening is calculated as shown in formula (30) at step 724. Relevant dead time (discrete dead time) 1 is determined from differential value $\Delta\theta_{th}$ of throttle opening obtained at step 724 and the engine rotational number N taken at step 722 by using a dead time table 751 at step 725.

Fundamental fuel injection pulse width $T_p$ is determined as is similarly to ordinary calculation of fuel injection pulse width at step 726. Data on the $T_p$ holding table 752 are shifted through address one by one in order from older data. That is, for example, $T_p(t_k)$ is moved to an address at which $T_p(t_{k-1})$ was stored. $T_p(t_k)$ which is determined at the above mentioned step 726 is stored in leading address of the $T_p$ holding table 752. $T_p$ at lth and $(t_{l+1})$th addresses from the leading address of the above mentioned $T_p$ holding table 752 are read as $T_p(t_k-t_l)$ and $T_p(t_k-t_{l+1})$, respectively at step 728.

Constants $A_1$, $A_2$, $B_0$, $B_{in}$ formula (32) are read from ROM at step 729. Correction value $\theta_1(t_{k-1})$ operated one time before and correction value $\theta_1(t_{k-2})$ operated two times before, which were stored in the ignition timing correction value table are read at step 730. Ignition timing correction value $\theta_1(t_k)$ at current time $t_k$ is then determined as shown in formula (32) at step 731. The determined $\theta_1(t_k)$ is stored in the ignition timing correction value table 753 after $\theta_1(t_{k-1})$ is shifted.

At step 732, fundamental ignition timing $\theta_0$ is determined and control ignition timing $\theta$ is determined from $\theta_0 - \theta_1(t_k)$. At step 732, a value of the control ignition timing is instructed to an ignition timing presetting I/0 register 754. When crank angle becomes equal to the instructed value, an ignition plug 27 is ignited by an electromotive force of an ignition coil 26. Step 734 is a step for converting time for next step. Step 722 is initiated again at next operation cycle.

It is possible to prepare a table with a driving parameter representative of running condition and a driving parameter representative of the degree of acceleration without limiting to the range shown in the above embodiment and to preset actually measured dead times on the table. In this case, driving parameters representative of running conditions include a throttle opening, an intake air amount, an intake manifold inner pressure, a coolant temperature, etc. as well as engine speed. Driving parameters representative of the degree of acceleration include a differential value of engine speed, a differential value of engine speed and change in fuel injection reference pulse width as well as a differential value of throttle opening.

A method of presetting control parameters in the aforementioned embodiment will now be described.

The method of presetting control parameters may be carried out by manipulating switches and the like by drivers. Alternatively, it is possible to provide a unit 813 for interpretating the driver's intention concerning with driving operation as shown in FIG. 25. The driver's intention interpretation unit 813 detects what driving operation driver perform under a given running condition, thereby to determine whether the driver desires fast or smooth rise-up of acceleration.

Inputted to the above-mentioned driver's intention interpretation unit 813 are a detection signal of driver's operation representated by an accelerator pedal step amount and a driving condition signal represented by engine speed, etc. and outputted are operation mode instructing signals which are referred to as "gentle", "sporty", etc.

The driver's intention interpretation unit 813 determines that a driver desires a "sporty" mode when the amount of one depression of the accelerator pedal, for example, under a certain driving circumstance in which there is a little change in the engine speed and determines that the driver desires a "gentle" mode when the step amount is less and determines that the driver desires a "normal" mode when the step amount is intermediate therebetween. The control parameters $K_1$ through $K_4$ are preset as shown in FIG. 26 in order to change the acceleration response characteristics of a vehicle corresponding to a respective result of determination. The values of control parameters $g_{kl}$ to $g_{k4}$, $n_{kl}$ to $n_{k4}$, $s_{kl}$ to $s_{k4}$ are preliminarily determined as appropriate values so that acceleration response characteristics are suited to "gentle" "normal" and "sporty" modes which are results of the above mentioned intention interpretation. For example, the control parameters $K_1$ to $K_4$ are preset to $S_{k1}$ to $S_{k4}$, respectively and are used in the ignition timing correction value operation unit 213 if "sporty"0 mode is chosen by the result of intention interpretation or driver's switch selection.

Figure 27:
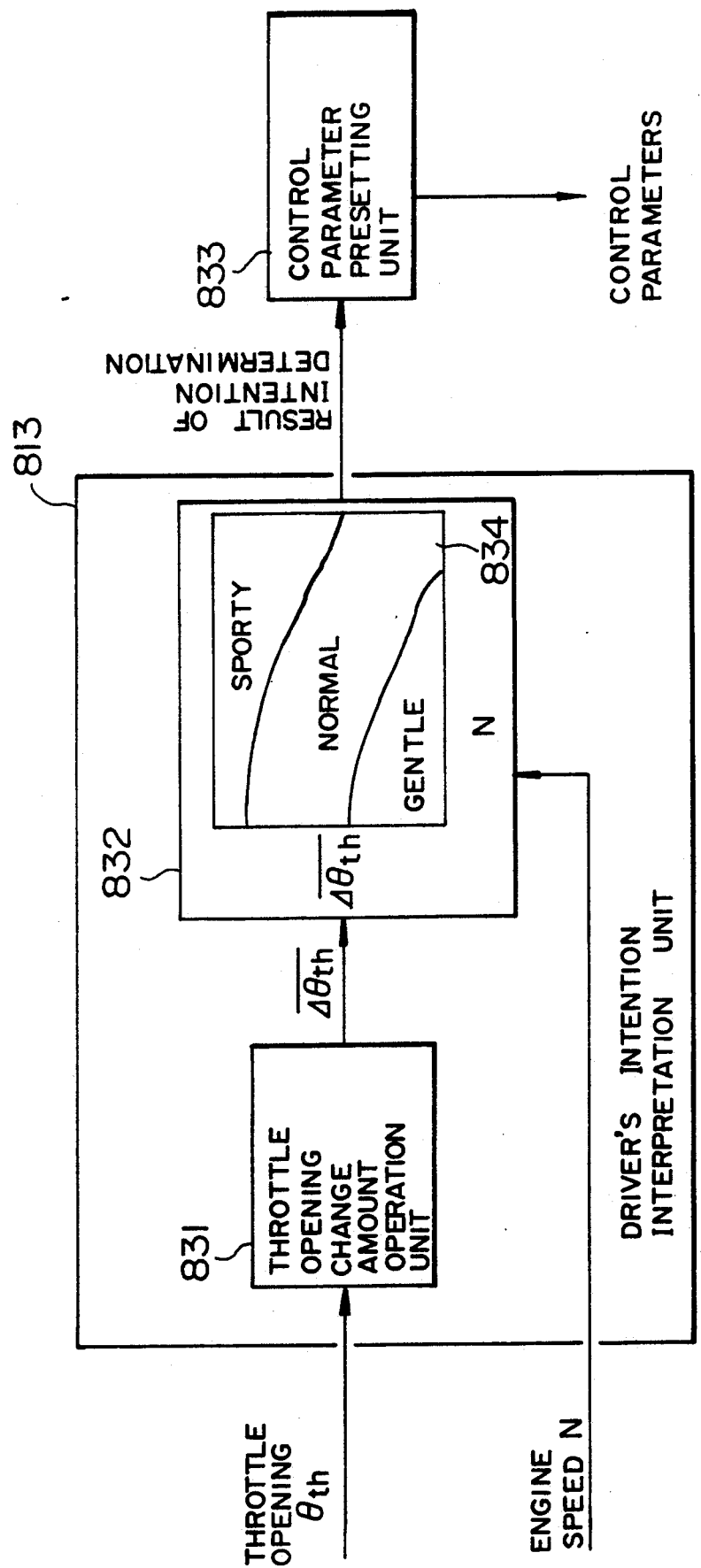
Figure 28:
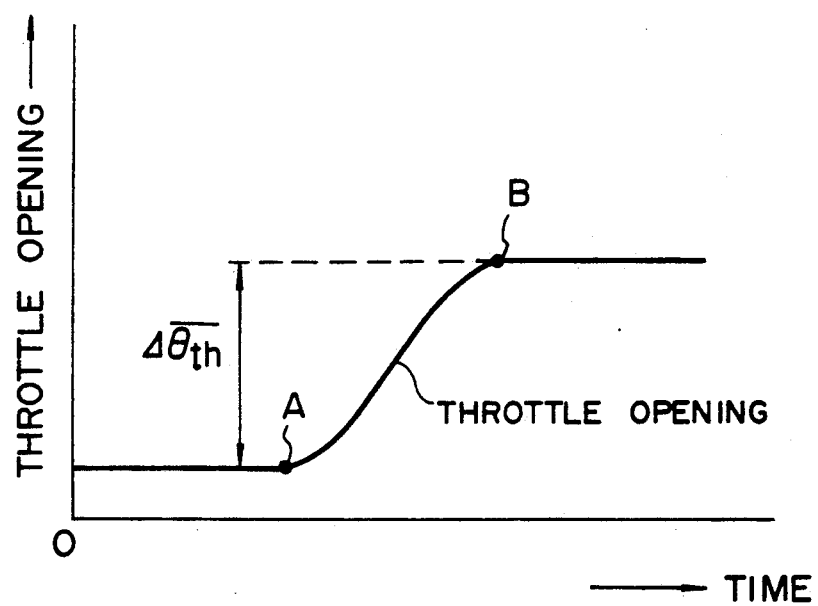

Operation of the present embodiment will be described in detail hereafter. As shown in FIG. 27, the driver's intention interpretation unit 813 includes a throttle opening change amount operation unit 831 and an intention determination result output unit 832. The throttle opening change amount operation unit 813 operates the amount of change in throttle opening corresponding to the amount of one depression of the accelerator pedal. As shown in FIG. 28, the throttle opening change amount operation unit 831 operates the change in throttle opening when the throttle opening changes from a steady operation state (point A) at which the throttle opening does not change until next steady operation state (point B) is reached. The throttle opening change is represented as $\Delta\theta_{th}$ and is referred to as "change in the amount of one time step". The intention determination result output unit 832 outputs a result of intention determination from the change in the amount of one time step $\Delta\theta_{th}$ determined by the throttle opening change amount operation unit 831 and the engine speed N. Areas of "sporty", "normal" and "gentle" modes are preliminarily preset on a two-dimensional memory map having coordinates represented by change in step amount and the engine speed N and a result of intention determination is obtained from $\Delta\theta_{th}$ and engine speed N with reference to the two dimensional memory map 834.

Values of control parameters $K_1$ to $K_4$ shown in FIG. 26 are preset based on the result of intention determination in control parameter presetting unit 833. For example, if the result of determination of intention interpretation is a "sporty" mode, the parameters are preset as follows:

$$K_1 = s_{K1}, K_2 = s_{K2}$$

$$K_3 = s_{K3}, K_4 = s_{K4}$$

The control parameters will become constants for calculating ignition timing correction values.

Now a method of presetting a control gain in the above mentioned embodiment will be described.

Figure 29:
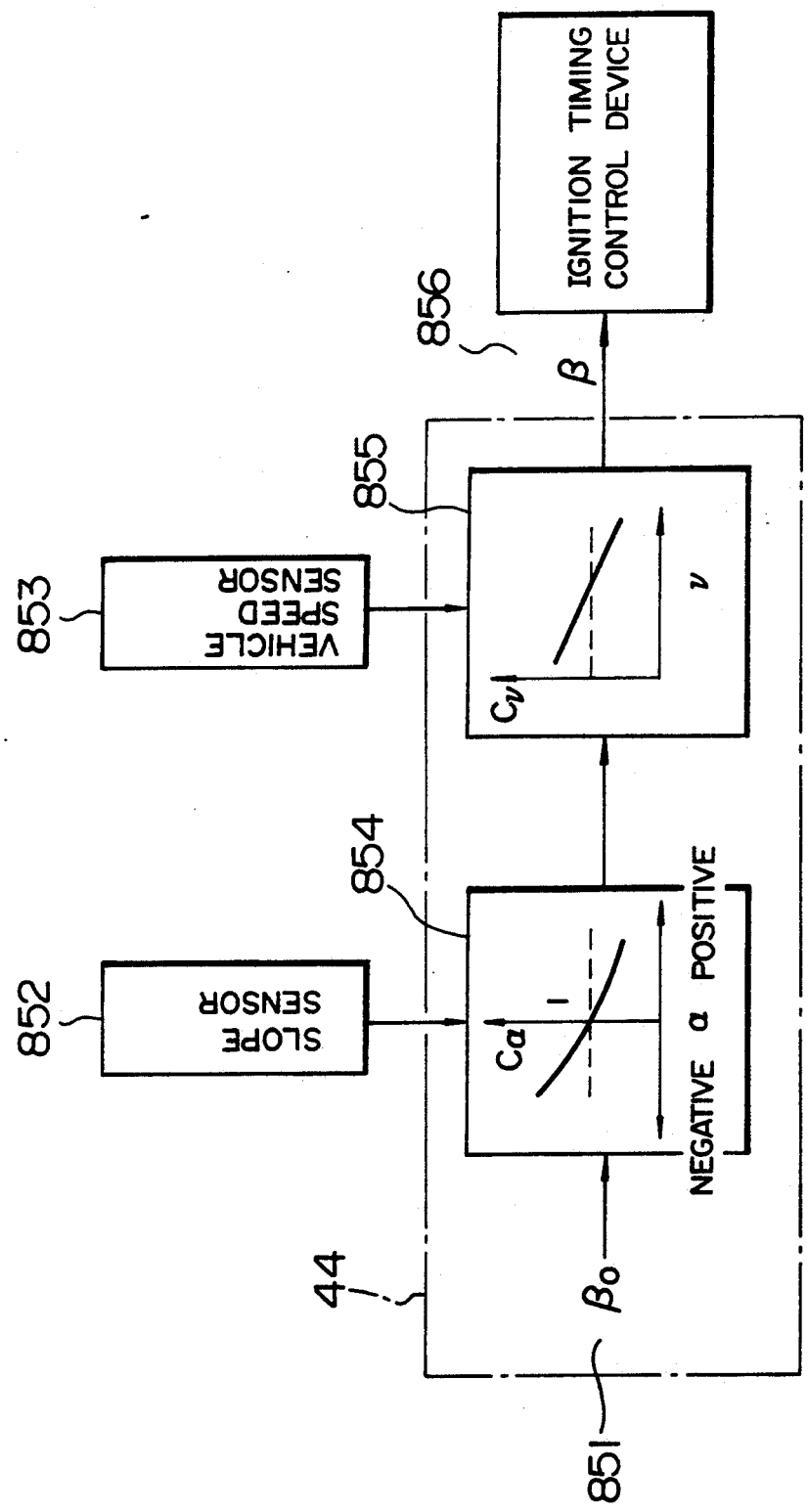
FIG. 29 is a view for explaining a method of presetting a control gain in the embodiment.

In FIG. 29, a control gain $\beta$ in the first embodiment is preset depending upon running load. That is, acceleration response pattern is changed depending upon the running load of a vehicle. In a gain presetting unit similar to the above mentioned control parameter presetting unit, the gain $\beta$ is changed depending on the output from the running load detector.

In FIG. 29, $\beta_0$(851) denotes a reference gain preset by a driver; 852 denotes a slope sensor mounted on a vehicle body for detecting slope angle $\alpha$ in a longitudinal direction of a vehicle; 853 denotes a vehicle speed sensor for detecting a vehicle speed; 854 a map for presetting constants $C_\alpha$ for the detected slope angel $\alpha$; 855 a map for presetting constants $C_v$ for the detected vehicle speeds. The preset value of the gain $\beta$(856) is given as $\beta = C_\alpha C_v \beta_0$.

A running load which resists to a driving force of a vehicle is herein referred to as positive running load and a running load which acts in the same direction as a driving force is referred to as a negative running load. If change in vehicle acceleration for accelerator pedal operation is fast on a down slope at which a vehicle is subject to a negative running load, the gain $\beta$ is preset slightly higher to suppress the change in acceleration for providing a slow response characteristic. Similarly, the gain $\beta$ is preset slightly lower in an up slope at which the running load is positive to decrease suppression of the vehicle acceleration for provide a sharp response characteristic. The gain $\beta$ may be preset by a formula concerning with running load.

Figure 30:
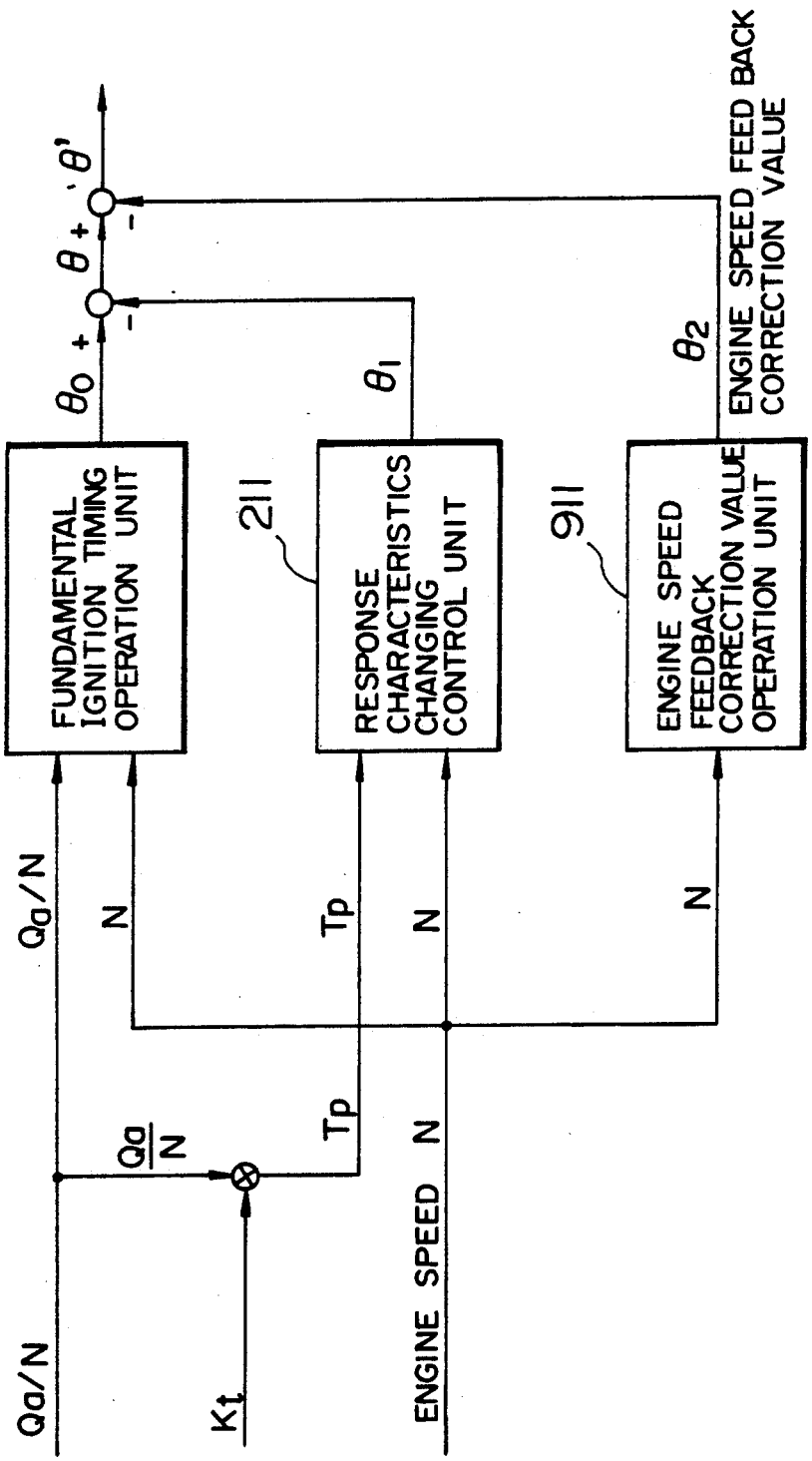
FIG. 30 is a block diagram showing the structure of a sixth embodiment.

Finally, a fifth embodiment which is an applied example of the first to third embodiments will be described. The present embodiment is a combination of the feedforward control system of the first to fourth embodiments with a feedback control system in which change in engine rotational number on acceleration is detected to correct the ignition timing depending upon the change. That is, in the present invention, a ignition correction value is determined by either one of methods (response characteristic changing control unit 211) shown in the first or second embodiment while vehicle longitudinal vibrations are detected from the engine speed to perform a feedback (rotational feedback correct value operation unit 911) for correcting the ignition timing as shown in FIG. 30.

The above mentioned response characteristic changing control unit 211 is designed to feedforward control the ignition timing correction value. Accordingly, since it is designed to control vibration suppression by predicting the generation of vehicle longitudinal vibration prior to detection thereof, acceleration surging does not occur from the beginning. However, it may be difficult to control vibration suppression if slight variation occurs in the torque generation dead time as mentioned above.

More specifically, in the fifth embodiment, the rotational number correction value operation unit 911 which provides a feedback signal from vehicle vibration detected by the change in the engine speed for correcting the ignition timing is provided in addition to a system for retrieving the dead time table which uses driving data representative of driving conditions and driving data representative of the degree of acceleration as described above. Although the engine speed feedback correction value operation unit 911 has a problem that it does not inherently commence control until the vibration is detected, if vibration suppression control is not sufficiently performed by the above mentioned response characteristic changing control unit 211, the vibration suppression control by the engine speed feedback correction value operation unit 911 would become effective.

Figure 31:
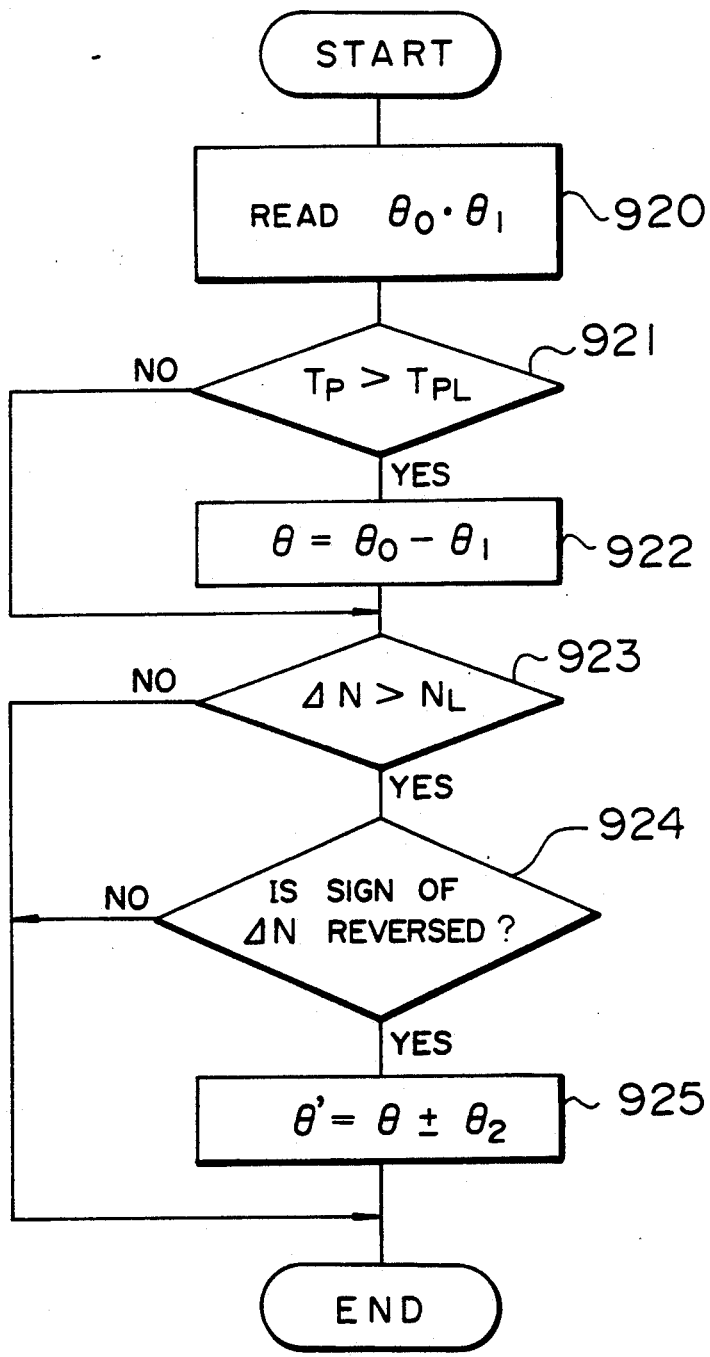
FIG. 31 is a flow chart showing the operation of the embodiment of FIG. 30.

Operation of the present embodiment will be described hereafter with reference to flow chart shown in FIG. 31.

Firstly, when the fundamental ignition timing value $\theta_0$ and the ignition timing correction value $\theta_1$ based on the virtual feedback response are read (step 920). When $T_P > T_{PL}$ and the acceleration condition is detected (step 921), ignition timing value which is corrected with $\theta_1$ is calculated as follows (step 922).

$$\theta = \theta_0 - \theta_1$$

Next, vehicle longitudinal vibration is detected by comparing the change $\Delta N$ in engine speed N with a given reference level $N_L$ at step 923. When $\Delta N > N_L$ and a moment at which N changes from increasing to decreasing or vice versa is detected, a given value is added to or subtracted from the ignition timing value $\theta'$ obtained by a feedback control system predetermined times for obtaining the controlled ignition timing (step 925). Correction of ignition timing is such that it advances when N decreases and delays when N increases. Accordingly the torque is decreased or increased when N increases or decreases, respectively.

Correction values of ignition timing are stored in a table as shown in FIG. 32. FIGS. 32(a) and 32(b) show experimental data obtained when ignition timing correction control is not performed and when only feedforward control based on virtual feedback response, is performed, respectively. FIG. 32(c) shows experimental data obtained when feedback control based on the change in engine speed is added to the feedforward control. In such a manner, a remarkable control effect can be obtained by combination of a feedforward control based on virtual feedback control with a feedback control based on change in engine speed.

All of the above mentioned embodiments in which the present invention is embodied have been exemplarily described. It is to be noted that the present invention should not be limited to only these embodiments.

As described above in detail, in accordance with the present invention, an engine torque output is detected by at least one of air amount/engine speed, intake manifold inner pressure and throttle opening in an engine control system which operates a fuel injection valve opening time and an ignition timing from engine speed, intake air amount or intake manifold inner pressure so that ignition timing adjustment is performed based on the engine torque output. Therefore, an effect is achieved that a response characteristic changing control system can be realized in which the vehicle's longitudinal vibrations can be suppress and a peak value of the vehicle's longitudinal acceleration or the acceleration curve can be optionally preset. Specifically, a response characteristic changing control system can be realized in which drivers' and occupants' favorite acceleration feeling can be given for example, by enabling acceleration curves having different vehicle's longitudinal accelerations to be optionally preset under a condition of the same depression amount of an accelerator pedal on acceleration.

Furthermore an effect that a method of accurately assuming a torque generation dead time from detection of acceleration to rise-up of torque can be realized by learning the torque generation dead time based on a differential value between a preset initial value corresponding to a driving parameter representative of the vehicle running condition and a driving parameter representative of the degree of acceleration.

What is claimed is:

1. An engine control method for changing the acceleration response characteristics of a vehicle, comprising the steps of:
   determining a value of the generated torque of an engine from at least one of measurement parameters including an intake air amount per one rotation of the engine, an intake manifold inner pressure and a throttle opening; and
   inputting the value of said generated torque to a control model for simulating the response characteristics of torque input to acceleration output of a drive-line system of said vehicle to produce an ignition timing correction value for adjusting the ignition timing in such a direction that a predetermined acceleration response characteristic is obtained in accordance with an output from the control model;
   adjusting the ignition timing in such a direction that the predetermined acceleration response characteristics are obtained in accordance with a value of said generated torque.

2. An engine control method for changing the acceleration response characteristics of a vehicle according to claim 1, further comprising the steps of:
   determining a fundamental ignition timing of the engine from at least one of the intake air amount per one rotation of the engine, the intake manifold inner pressure and the throttle opening; and
   controlling ignition in said engine at an ignition timing determined by adding said fundamental ignition timing with said ignition timing correction value.

3. An engine control method according to claim 1, wherein said control model is represented by a transfer function which is a second-order lag element.

4. An engine control method according to claim 1, wherein said step a determining in said value of generated torque includes holding the values of said measurements parameters during a dead time from a time when said measurement parameters are measured to a time when a first combustion stroke occurs and calculating the generated torque when said dead time has passed using said held parameter values.

5. An engine control method according to claim 4, wherein said dead time is determined by the engine speed value at the time when said measurement parameters are measured.

6. An engine control method according to claim 5, wherein said step for operating said generated torque includes a step of smoothing processing said measured parameter values.

7. An engine control method according to claim 6, wherein in said step of smoothing processing, said measurement parameter values are passed through a first-order lag element of the transfer function.

8. An engine control method according to claim 5, wherein said step of operating said generated torque further includes a step of smoothing processing the calculated torque value.

9. An engine control method according to claim 8, wherein in said step of smoothing processing, said measurement parameter values are passed through a first order-lag element of the transfer function.

10. An engine control method according to claim 4, wherein said dead time is estimated based on a parameter representative of the driving condition of the engine and a parameter representative of the acceleration degree of the vehicle.

11. An engine control method according to any one of claims 5 through 9, wherein said dead time is estimated based on a parameter representative of the driving condition of the engine and a parameter representative of the acceleration degree of the vehicle.

12. An engine control method according to claim 11, wherein an initial value of the dead time is determined with reference to a dead time data table which is preset corresponding to a parameter representative of the engine driving condition and a parameter representative of the acceleration degree of the vehicle, in which a difference between dead time data of said dead time data table and other dead time data obtained by a dead time estimate method is stored as a learned value and in which a true dead time is estimated using said initial value of the dead time and said learned value.

13. An engine control method according to claim 10 wherein the engine speed value is used as said parameter representative of the engine driving conditions.

14. An engine control method according to claim 10, wherein the amount of the engine intake air is used as said parameter representative of said engine driving conditions.

15. An engine control method according to claim 10, wherein the engine intake air amount is used as said parameter representative of the engine driving conditions.

16. An engine control method according to claim 10, wherein an engine intake manifold inner pressure is used as said parameter representative of said engine driving conditions.

17. An engine control method according to claim 10, wherein a changing rate of the throttle opening of the engine is used as said parameter representative of the acceleration degree of the vehicle.

18. An engine control method according to claim 10, wherein a changing rate of the vehicle speed is used as said parameter representative of the acceleration degree of the vehicle.

19. An engine control method according to claim 10, wherein a changing rate of the vehicle speed is used as said parameter representative of the acceleration degree of the vehicle.

20. An engine control method according to claim 10, wherein a changing rate of the engine speed is used as said parameter representative of the acceleration degree of the vehicle.

21. An engine control method according to claim 10, wherein a changing rate of the fundamental pulse width of fuel injection of said engine is used as said parameter representative of the acceleration degree of the vehicle.

22. An engine control system for changing the acceleration response characteristics of a vehicle, comprising:

sensor means for measuring at least one of measurement parameters including an intake air amount per one rotation of the engine, an intake manifold inner pressure and a throttle opening;

means for determining a value of the generated torque of the engine based on an output of said sensor means; and ignition timing adjusting means, including a control model simulating response characteristics of torque input vs. acceleration output of a drive-line system of said vehicle, and responsive to a value of generated torque input to said control model for producing an ignition timing correction value to adjust the ignition timing in such a direction that a certain acceleration response characteristic is obtained in accordance with an output from the control model.

23. An engine control system for changing the acceleration response characteristics of a vehicle, according to claim 22, further including:

means for determining a fundamental ignition timing of the engine on the basis of at least one of the intake air amount per one rotation of the engine, the intake manifold inner pressure and the throttle opening; and means for effecting ignition in the engine at time determined by adding said fundamental ignition timing with said ignition timing correction value.

* * * * *